US012739495B2

(12) United States Patent
Ham et al.

(10) Patent No.: US 12,739,495 B2
(45) Date of Patent: Sep. 15, 2026

(54) ELECTRONIC DEVICE INCLUDING SIDE MOUNTED SENSOR AND METHOD FOR CONTROLLING CAMERA OF THE ELECTRONIC DEVICE

(71) Applicant: SAMSUNG ELECTRONICS CO., LTD., Suwon-si (KR)

(72) Inventors: Sunwoong Ham, Suwon-si (KR); Nahye Kim, Suwon-si (KR); Hyerim Kim, Suwon-si (KR); Jeesu Park, Suwon-si (KR); Wonkyu Sung, Suwon-si (KR); Daekwang Jung, Suwon-si (KR); Yunsu Cho, Suwon-si (KR); Doyoung Choi, Suwon-si (KR); Inje Hwang, Suwon-si (KR); Jihea Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 18/819,074

(22) Filed: Aug. 29, 2024

(65) Prior Publication Data

US 2025/0080829 A1 Mar. 6, 2025

Related U.S. Application Data

(63) Continuation of application No. PCT/KR2024/096124, filed on Aug. 29, 2024.

(30) Foreign Application Priority Data

Aug. 31, 2023 (KR) ........................ 10-2023-0115163
Sep. 27, 2023 (KR) ........................ 10-2023-0130298

(51) Int. Cl.
*H04N 23/62* (2023.01)
*H04N 23/667* (2023.01)

(52) U.S. Cl.
CPC ........... *H04N 23/62* (2023.01); *H04N 23/667* (2023.01)

(58) Field of Classification Search
CPC .... H04N 23/667; H04N 23/62; H04N 23/675; H04N 23/631; H04N 1/00352; H04N 1/00387; H04N 1/00392; H04N 1/00389
See application file for complete search history.

(56) References Cited

U.S. PATENT DOCUMENTS 10,209,882 B2 2/2019 S et al.
10,645,294 B1 5/2020 Manzari et al.
(Continued)

FOREIGN PATENT DOCUMENTS

CN 110602395 12/2019
KR 10-2014-0140855 12/2014
(Continued)

OTHER PUBLICATIONS

Search Report and Written Opinion dated Dec. 13, 2024 issued in International Patent Application No. PCT/KR2024/096124.

*Primary Examiner* — Kelly L Jerabek
(74) *Attorney, Agent, or Firm* — Nixon & Vanderhye P.C.

(57) ABSTRACT

An electronic device according to an embodiment of the disclosure may include: a camera; at least one processor comprising processing circuitry; at least one display; a sensor having a sensing region on a side surface of the electronic device; and a memory. The memory may store instructions, and at least one processor, individually and/or collectively, is configured to: execute a camera application for controlling the camera; based on the camera application being executed, sense a vertical swipe input through the sensor; control a first function of the camera, based on the vertical swipe input; sense a horizontal swipe input through (Continued)

the sensor; and control a second function of the camera, based on the horizontal swipe input.

18 Claims, 18 Drawing Sheets

(56) References Cited

U.S. PATENT DOCUMENTS

| | | | | |
|---|---|---|---|---|
| 10,949,012 | B2 | 3/2021 | Choi et al. | |
| 2014/0354874 | A1 | 12/2014 | Lee | |
| 2015/0350533 | A1* | 12/2015 | Harris | H04N 23/73 348/362 |
| 2016/0110093 | A1* | 4/2016 | S | G06F 3/04847 715/863 |
| 2016/0212328 | A1* | 7/2016 | Lee | G06F 3/0488 |
| 2016/0360118 | A1* | 12/2016 | Morgenstern | H04N 23/62 |
| 2018/0052540 | A1 | 2/2018 | Myers et al. | |
| 2018/0164166 | A1 | 6/2018 | Teil | |
| 2019/0073077 | A1 | 3/2019 | Kim et al. | |
| 2019/0174069 | A1* | 6/2019 | Poindexter, Jr. | G06F 3/04886 |
| 2020/0244262 | A1 | 7/2020 | Bushnell et al. | |
| 2020/0257391 | A1 | 8/2020 | Kugler et al. | |
| 2021/0112206 | A1* | 4/2021 | Hwang | H04N 23/632 |
| 2021/0278945 | A1 | 9/2021 | Li et al. | |
| 2023/0012223 | A1 | 1/2023 | Gleeson et al. | |

FOREIGN PATENT DOCUMENTS

| | | |
|---|---|---|
| KR | 10-2016-0046727 | 4/2016 |
| KR | 10-2016-0072865 | 6/2016 |
| KR | 20190027553 A | 3/2019 |
| KR | 10-2020-0130198 | 11/2020 |
| KR | 20210107887 A | 9/2021 |
| KR | 20220102898 A | 7/2022 |

* cited by examiner 101
201
202
203
204
205
260
280a
620
START/SWITCHING (601)
FAILURE/ERROR (603)
EXECUTION GUIDE/PAUSE (605)
IMPENDING TERMINATION (607)
MANIPULATION (609)
TERMINATION (611)
INCREASE/DECREASE/
STRONG/WEAK (612)
PREPARATION/CONFIRMATION (613)
STRENGTH
TIME

FIG. 11

101
1203
280a
840
852
851
850
UW
W
T
ST
PRO
823
821
822
260
1220
204
205
101
1201
280a
840
852
851
850
UW
W
T
ST
PRO
823
821
822
260
1210

FIG. 14

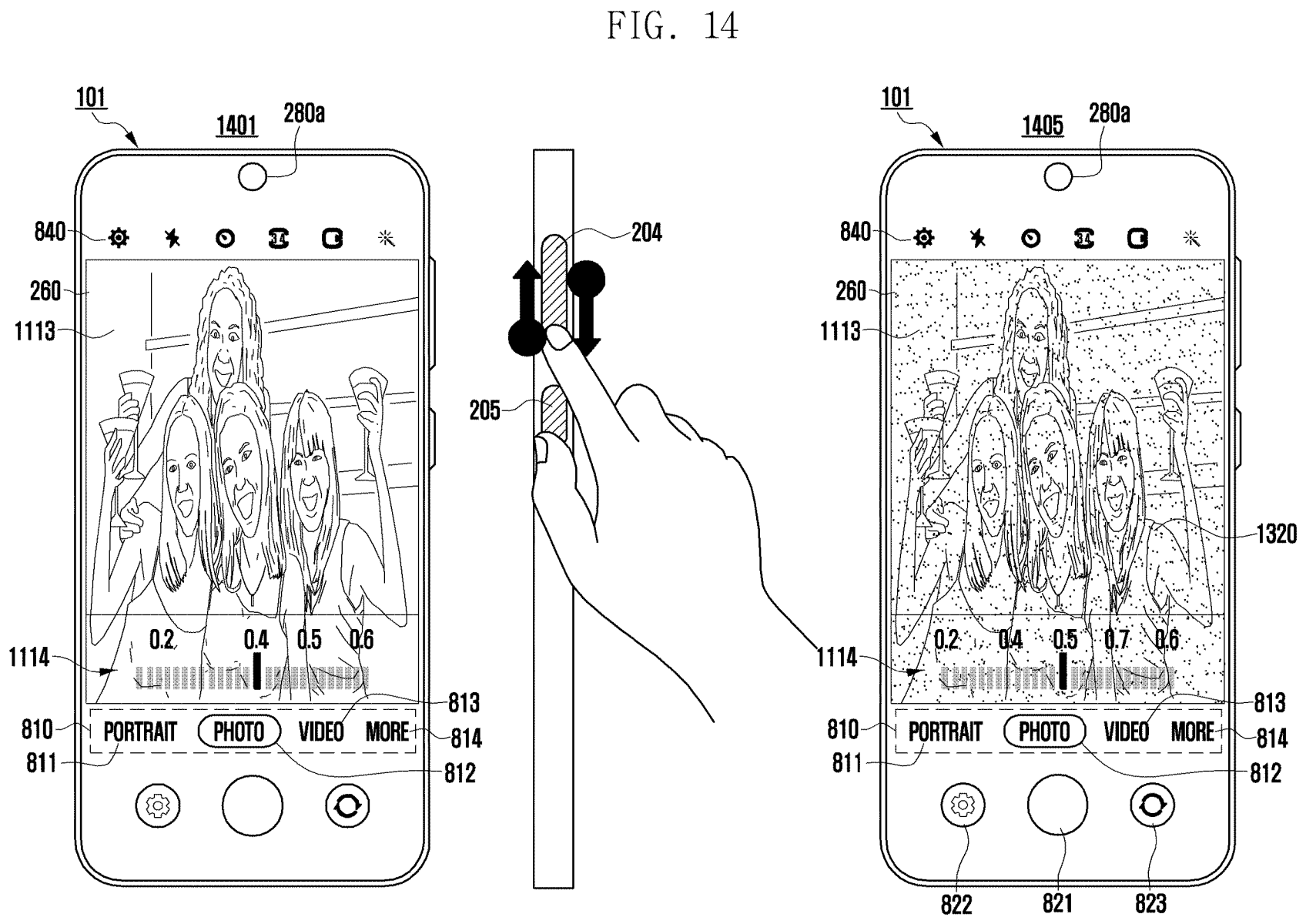

101
1405
280a
840
260
1113
1114
810
811
812
813
814
821
822
823
1320
0.2
0.4
0.5
0.7
0.6
PORTRAIT
PHOTO
VIDEO
MORE 204
205

101
1401
280a
840
260
1113
1114
810
811
812
813
814
0.2
0.4
0.5
0.6
PORTRAIT
PHOTO
VIDEO
MORE 101
1603
280a
260
1610
Picture
204
205
101
1601
280a
260
1510
Picture 204
205
101
1701
280a
260
1703
1710
1705
+90
-2.0
-90

ELECTRONIC DEVICE INCLUDING SIDE MOUNTED SENSOR AND METHOD FOR CONTROLLING CAMERA OF THE ELECTRONIC DEVICE

CROSS-REFERENCE TO RELATED APPLICATIONS

This application is a continuation of International Application No. PCT/KR2024/096124 designating the United States, filed on Aug. 29, 2024, in the Korean Intellectual Property Receiving Office and claiming priority to Korean Patent Application Nos. 10-2023-0115163, filed on Aug. 31, 2023, and 10-2023-0130298, filed on Sep. 27, 2023, in the Korean Intellectual Property Office, the disclosures of each of which are incorporated by reference herein in their entireties.

BACKGROUND

Field

The disclosure relates to an electronic device and a method for controlling a camera.

Description of Related Art

Various electronic devices, for example, wearable devices such as smartphones, tablet PCs, portable multimedia players (PMPs), personal digital assistants (PDAs), laptop personal computers, wrist watches, and head-mounted displays (HMDs) may include cameras such that images are captured using the cameras.

When a camera included in an electronic device is used to capture images of subjects, the camera may be controlled through touch inputs made on a touch-sensitive display. However, there is a problem in that, when the camera is controlled through touch inputs made on the display, it is difficult to capture images with the camera while identifying the subjects.

SUMMARY

Embodiments of the disclosure provide an electronic device and a camera control method that control the camera using sensors disposed on a side surface of the housing of the electronic device.

An electronic device according to an example embodiment of the disclosure may include: a camera; at least one processor, comprising processing circuitry; at least one display; a sensor having a sensing region on a side surface of the electronic device; and a memory.

The memory according to an example embodiment of the disclosure may store instructions, and at least one processor is configured to execute the instructions. At least one processor, individually and/or collectively, may be configured to cause the electronic device to: execute a camera application for controlling the camera; based on the camera application being executed, sense a vertical swipe input through the sensor; control a first function of the camera, based on the vertical swipe input; sense a horizontal swipe input through the sensor; and control a second function of the camera, based on the horizontal swipe input.

A method for controlling a camera of an electronic device according to an example embodiment of the disclosure may include: executing a camera application for controlling the camera; based on the camera application being executed, sensing a vertical swipe input through a sensor; controlling a first function of the camera, based on the vertical swipe input; sensing a horizontal swipe input through the sensor; and controlling a second function of the camera, based on the horizontal swipe input.

An electronic device and a camera control method according to an example embodiment of the disclosure are advantageous in that a camera is controlled using sensors disposed on a side surface of the housing of the electronic device such that the camera can be controlled while intuitively recognizing subjects.

BRIEF DESCRIPTION OF THE DRAWINGS

In relation to description of the drawings, identical or similar components may be given identical or similar reference numerals. Further, the above and other aspects, features and advantages of certain embodiments of the present disclosure will be more apparent from the following detailed description, taken in conjunction with the accompanying drawings, in which:

FIG. 11 is a diagram illustrating an example focus setting method of an electronic device according to various embodiments;

FIG. 14 is a diagram illustrating an example focus setting method of an electronic device according to various embodiments;

DETAILED DESCRIPTION

Figure 1:
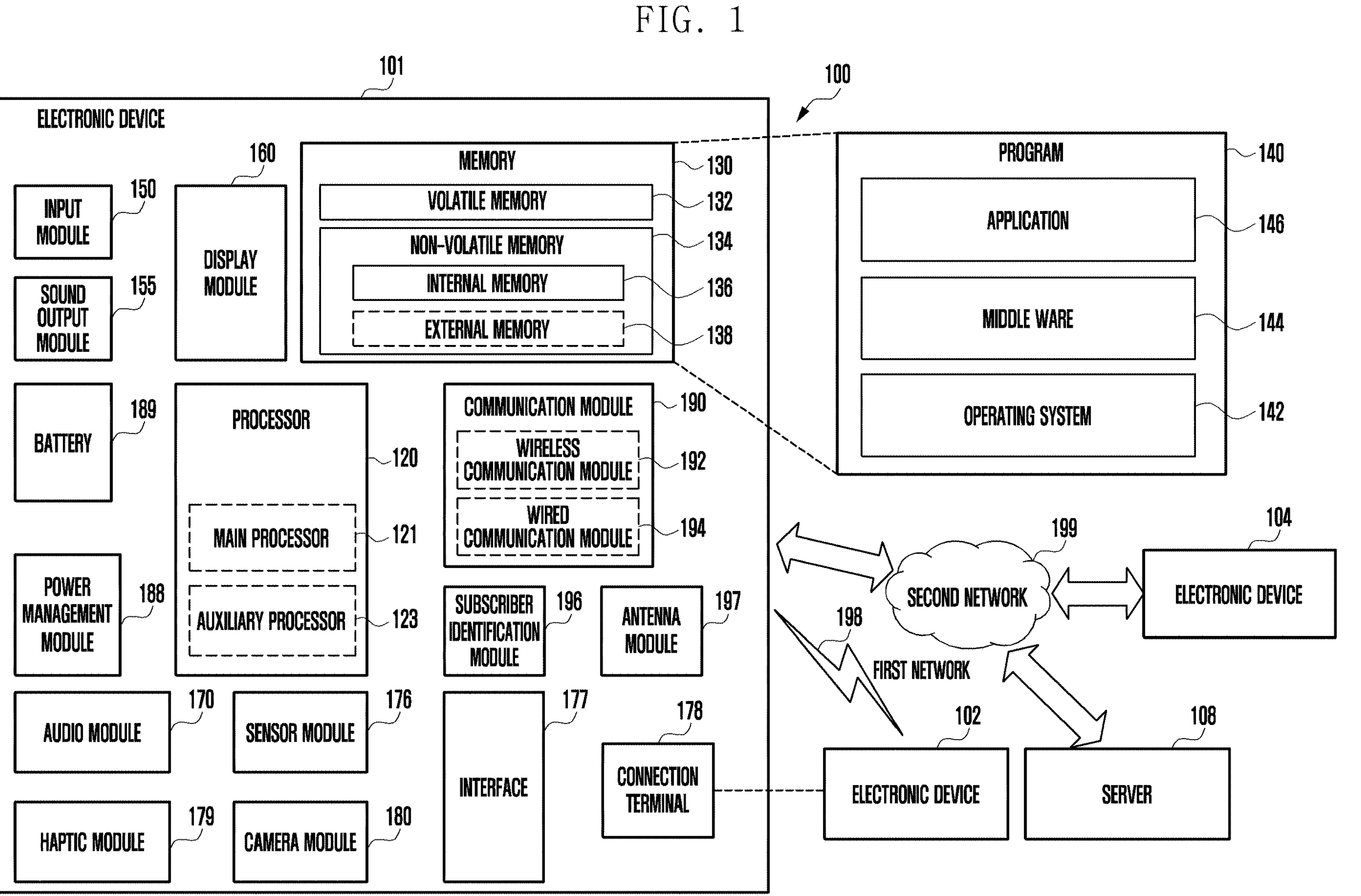
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
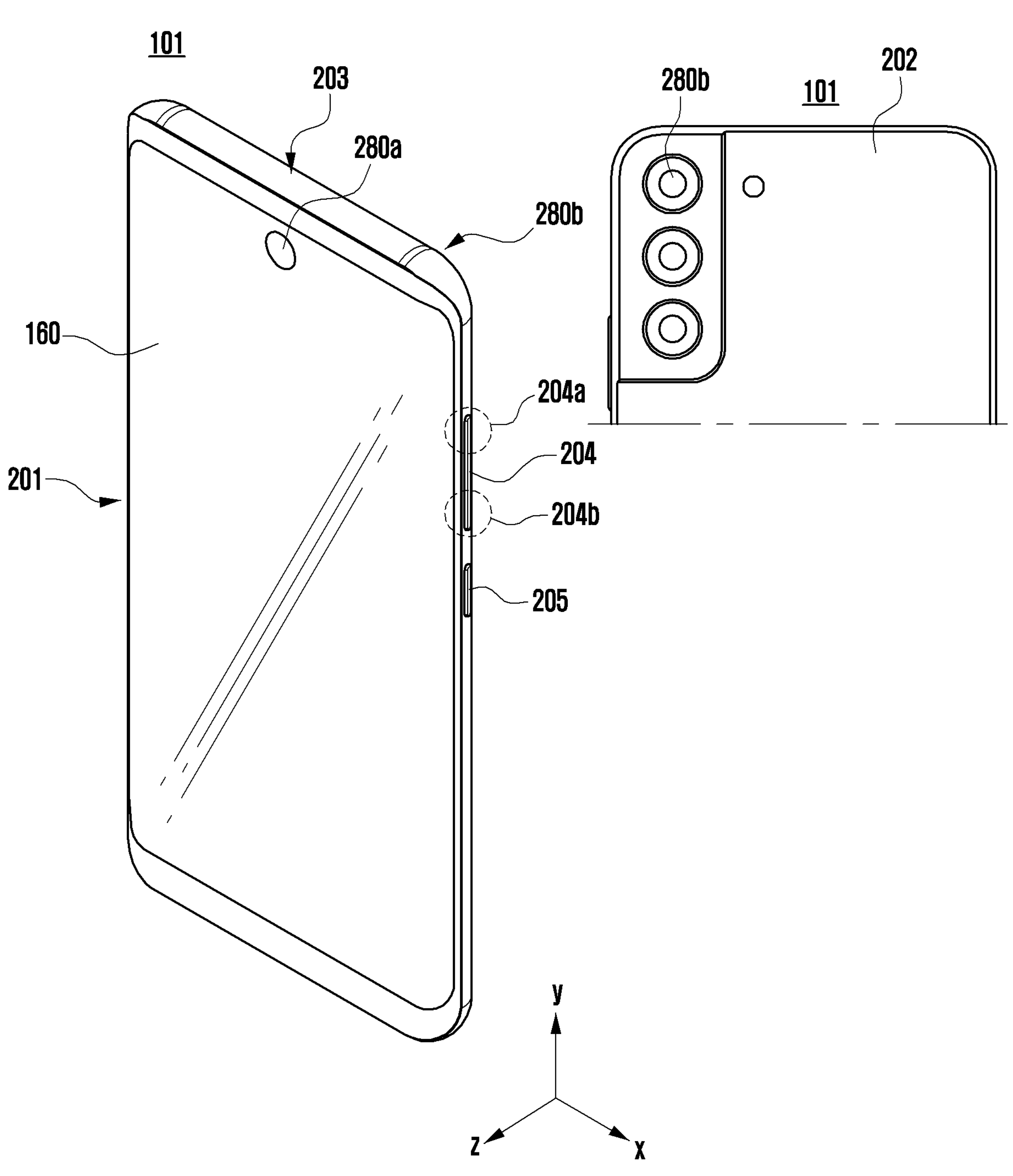
FIG. 2 is a diagram including a perspective view of an electronic device according to various embodiments.

FIG. 2 is a diagram including a perspective view of an electronic device 101 according to various embodiments.

In an embodiment, the electronic device 101 may include a display 260, a first camera 280*a*, a second camera 280*b*, a first sensor 204, and a second sensor 205.

In an embodiment, the display 260 may be disposed on the first surface 201 of the electronic device 101, and the second camera 280*b* may be disposed on the second surface 202 parallel to the first surface 201. For example, the first surface 201 may include the front surface, and the second surface 202 may include the rear surface. The first surface 201 and the second surface 202 may have substantially the same shape, and may have a substantially rectangular shape.

In an embodiment, the electronic device 101 may include a third surface 203 surrounding the first surface 201 and the second surface 202. The third surface 203 may include a side surface.

In an embodiment, the electronic device 101 may include a conductive member (e.g., including a conductive material) on at least a part of the third surface 203. The electronic device 101 may use the conductive member included on at least a part of the third surface 203 has an antenna 197.

In an embodiment, the display 260 may have a region corresponding to the first camera 280*a* formed as a transmissive region having a designated transmittance.

In an embodiment, the transmissive region may be formed to have a transmittance in a range of about 5% to about 20%. The transmissive region may include a region overlapping the effective region (for example, field-of-view region) of the first camera 280*a* so as to transmit light to an image sensor which then forms an image therefrom. For example, the transmissive region of the display 260 may include a region, the pixel disposition density and/or wiring density thereof are lower than those of the periphery thereof.

In an embodiment, the display 260 may include at least one display. For example, the display 260 may include a flexible display and/or a rigid display. For example, the display 260 may include a main display and/or a sub-display.

In an embodiment, the transmissive region may replace the above-described opening. The first camera 280*a* may include an under-display camera (UDC).

In an embodiment, at least one camera (for example, a first camera 280*a* and a second camera 280*b*) may include one or multiple lenses, an image sensor, and/or an image signal processor.

In an embodiment, the position or number of the at least one camera (for example, a first camera 280*a* and a second camera 280*b*) may vary.

In an embodiment, the electronic device 101 may include a second camera 280*b* positioned to correspond to the second surface 202. The second surface 202 of the electronic device 101 may include a cover. For example, the cover may be made of glass, metal, plastic, and/or a combination thereof.

In an embodiment, the cover may include at least one opening corresponding to the shape of the second camera 280*b*, and the second camera 280*b* may be exposed to the outside through the at least one opening (or camera holes).

In an embodiment, the cover may be formed to include an optically transmissive region corresponding to the second camera 280*b* without at least one opening (or camera holes).

In an embodiment, the second camera 280*b* may include multiple cameras. The multiple cameras included in the second camera 280*b* may have different attributes (for example, fields of view) or functions.

For example, the second camera **280*b* may include a dual or triple camera. The second camera 280*b*** may include multiple cameras including lenses having different fields of view.

The electronic device 101 may control the field of view of the second camera **280*b* performed in the electronic device 101, based on the user's selection. The second camera 280*b*** may include at least one of a wide-angle camera, a telephoto camera, a color camera, a monochrome camera, or an infrared (IR) camera (for example, time of flight (TOF) camera, structured light camera).

In an embodiment, each of the first sensor 204 and the second sensor 205 may sense touches and/or pressures. Each of the first sensor 204 and the second sensor 205 may further include an actuator. Using the actuators, the electronic device 101 may provide haptic feedbacks corresponding to touches and/or pressures sensed through the first sensor 204 and the second 205.

In an embodiment, each of the first sensor 204 and the second sensor 205 may include a capacitive sensor and/or an ultrasonic sensor in order to sense touches.

In an embodiment, each of the first sensor 204 and the second sensor 205 may include a capacitive sensor and/or a strain gauge capable of sensing pressures, based on a change in internal resistance, capacitance, or inductance, in order to sense pressures.

In an embodiment, each of the first sensor 204 and the second sensor 205 may include a piezo actuator, a horizontal motor, a vertical motor, an acoustic plate, a coil motor, and/or a combination thereof as actuators such that haptic feedback can be provided under the control of the processor 120.

In an embodiment, the first sensor 204 may include a first region **204*a* and a second region 204*b*. With reference to the y-axis, the top from the center of the first sensor 204 may be the first region 204*a*, and the bottom may be the second region 204*b***.

In an embodiment, the electronic device 101 may include a bar-shaped electronic device, an electronic device including a flexible display, an electronic device including a foldable housing and a flexible display, and/or an electronic device including a rollable housing and a flexible display.

Figure 3:
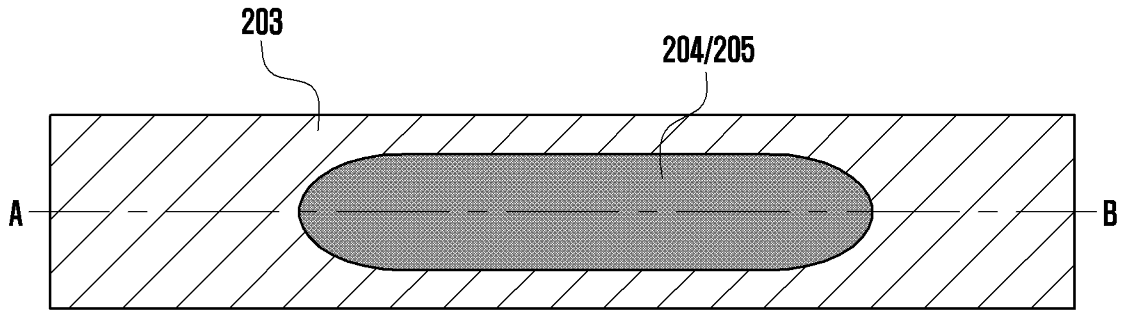
FIG. 3 is a diagram illustrating at least one sensor according to various embodiments.

FIG. 3 is a diagram illustrating at least one sensor 204 and 205 according to various embodiments.

Figure 4:
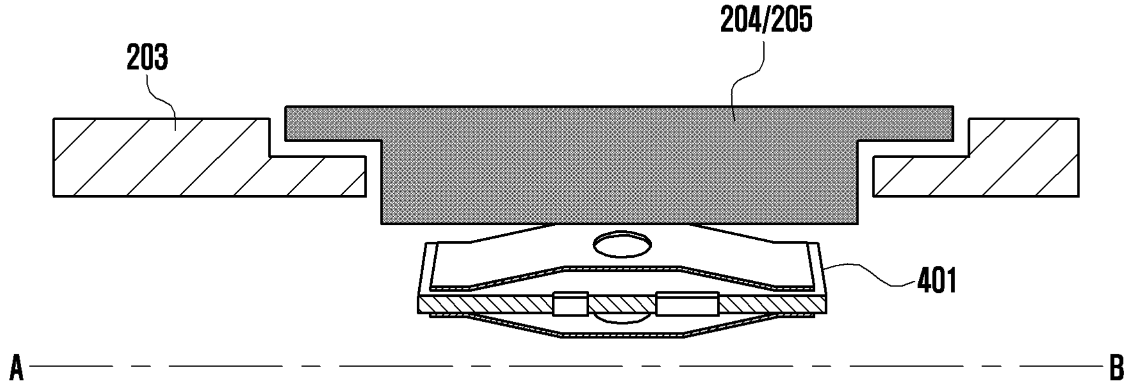
FIG. 4 is a sectional view of at least one sensor of FIG. 3 taken along lien A-B according to various embodiments.

FIG. 4 is a sectional view of at least one sensor 204 and 205 in FIG. 3 taken along line A-B according to various embodiments.

Referring to FIG. 3 and FIG. 4, at least one sensor 204 and 205 may be disposed on at least a part of the third surface 203. The at least one sensor 204 and 205 may be identical or similar to the first sensor 204 and the second sensor 205 in FIG. 2, and repeated descriptions thereof may not be repeated here. An actuator 401 may be included below the at least one sensor 204 and 205 or inside the electronic device 101 such that haptic feedback can be provided under the control of the processor 120. The actuator 401 may include, for example, a piezo actuator, a horizontal motor, a vertical motor, an acoustic plate, a coil motor, and/or a combination thereof.

In an embodiment, the at least one sensor 204 and 205 may be disposed on at least a part of a side surface (for example, the third surface 203) of the electronic device 101. The at least one sensor 204 and 205 may include a sensor region on a side surface (for example, the third surface 203) of the electronic device 101. The at least one sensor 204 and 205 may have a sensing region.

In an embodiment, the at least one sensor 204 and 205 may be formed on at least a part of a side surface (for example, the third surface 203) of the electronic device 101 as at least partially protruding buttons.

Figure 5:
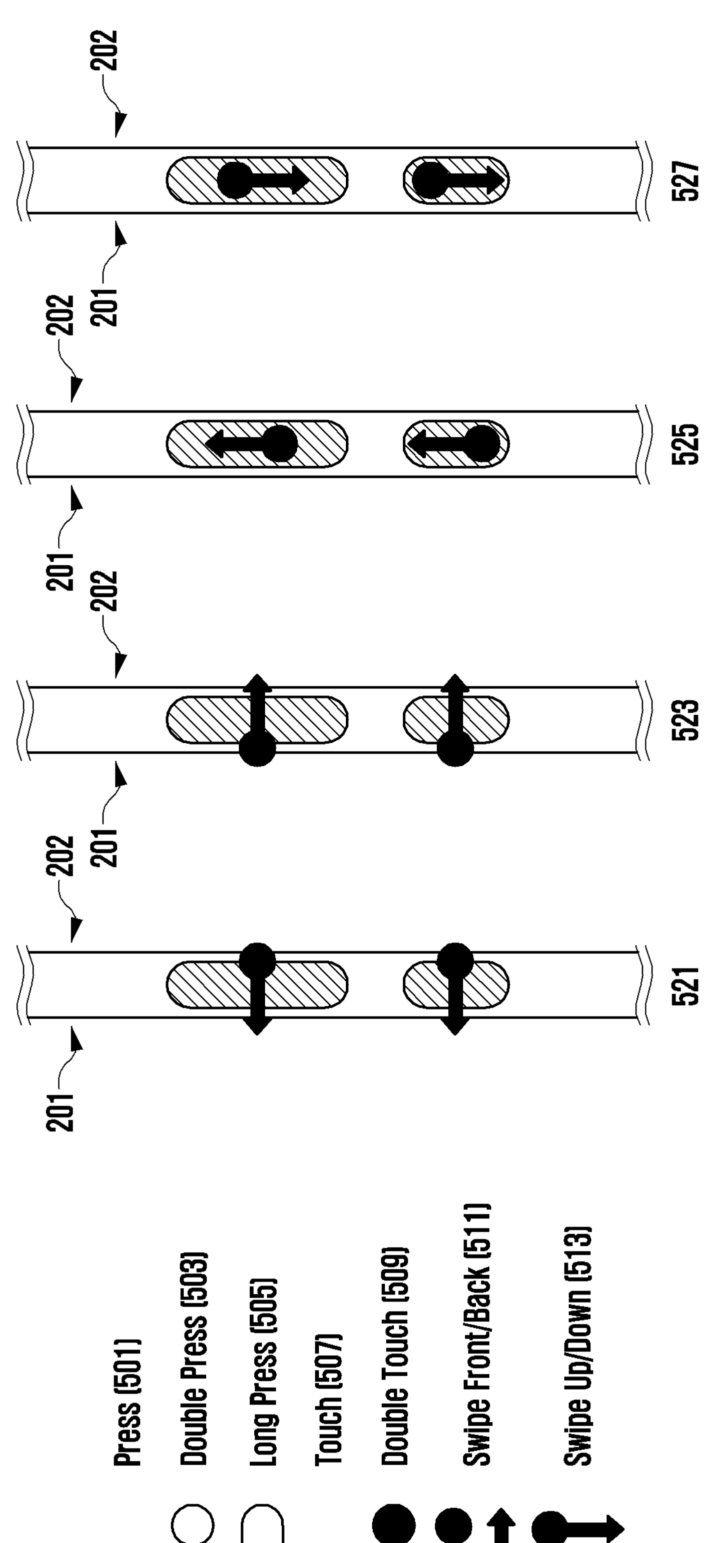
FIG. 5 is a diagram illustrating various example user inputs or interactions through a first sensor and a second sensor according to various embodiments.

FIG. 5 is a diagram illustrating example user inputs or interactions through a first sensor 204 and a second sensor 205 according to various embodiments.

In an embodiment, upon sensing a pressing force applied in a certain position on the first sensor 204 or the second sensor 205 with a higher pressure than a first designated pressure level, the electronic device 101 may determine that the user input or interaction on the first sensor 204 or the second sensor 205 is a press 501. The press 501, among user inputs, may refer to a pressing input applied in a certain position on the first sensor 204 or the second sensor 205 with a higher pressure than a first designated pressure level.

In an embodiment, upon sensing a pressing force applied in a certain position on the first sensor 204 or the second sensor 205 with a higher pressure than a first designated pressure level two times at a certain time interval, the electronic device 101 may determine that the user input or interaction on the first sensor 204 or the second sensor 205 is a double press 503. The double press 503, among user inputs, may refer to a pressing input applied in a certain position on the first sensor 204 or the second sensor 205 with a higher pressure than a first designated pressure level two times at a certain time interval.

Although the double press 503 is simply indicated by two circles in FIG. 5, these schematically illustrate two pressing operations at a certain time interval in an identical certain position (not in different positions).

In an embodiment, upon sensing a pressing force applied in a certain position on the first sensor 204 or the second sensor 205 with a higher pressure than a first designated pressure level for a certain time or longer, the electronic device 101 may determine that the user input or interaction on the first sensor 204 or the second sensor 205 is a long press 505. The long press 505, among user inputs, may refer to a pressing input applied in a certain position on the first sensor 204 or the second sensor 205 with a higher pressure than a first designated pressure level for a certain time or longer.

In an embodiment, upon sensing a pressing force applied in a certain position on the first sensor 204 or the second sensor 205 with a higher pressure than a first designated pressure level N times (N is a natural number equal to or larger than 3) at a certain time interval, the electronic device 101 may determine that the user input or interaction on the first sensor 204 or the second sensor 205 is an N-times press. The N-times press, among user inputs, may refer to a pressing input applied in a certain position on the first sensor 204 or the second sensor 205 with a higher pressure than a first designated pressure level N times at a certain time interval.

In an embodiment, upon sensing a pressing force applied in a certain position on the first sensor 204 and in a certain position on the second sensor 205 with a higher pressure than a first designated pressure level, the electronic device 101 may determine that the user input or interaction on the first sensor 204 and the second sensor 205 is a combination press. The combination press, among user inputs, may refer to a pressing input applied in a certain position on the first sensor 204 and in a certain position on the second sensor 205 with a higher pressure than a first designated pressure level.

In an embodiment, upon sensing a pressing force applied in a certain position on the first sensor 204 or the second sensor 205 with a lower pressure than a second designated pressure level, the electronic device 101 may determine that the user input or interaction on the first sensor 204 or the second sensor 205 is a touch 507. The touch 507, among user inputs, may refer to a pressing input applied in a certain position on the first sensor 204 or the second sensor 205 with a lower pressure than a second designated pressure level. The second designated pressure level may be identical to the first designated pressure level. However, this is not limiting, and the second designated pressure level may be lower than the first designated pressure level. For example, if the first designated pressure level is 10, the second designated pressure level may be 9 which is less than 10.

In an embodiment, upon sensing a pressing force applied in a certain position on the first sensor 204 or the second sensor 205 with a lower pressure than a second designated pressure level two times at a certain time interval, the electronic device 101 may determine that the user input or interaction on the first sensor 204 or the second sensor 205 is a double touch 509. The double touch 509, among user inputs, may refer to a pressing input applied in a certain position on the first sensor 204 or the second sensor 205 with a lower pressure than a second designated pressure level two times at a certain time interval. The second touch that follows the first touch may be a separate input from the first touch. The separate input may refer, for example, to the input in a certain position on the first sensor 204 or the second sensor 205 being released, and a new touch input is then made.

Although the double touch 509 is simply indicated by two circles in FIG. 5, these schematically illustrate two pressing operations at a certain time interval in an identical certain position (not in different positions).

In an embodiment, upon sensing a pressing force applied in a certain position on the first sensor 204 or the second sensor 205 with a lower pressure than a second designated pressure level N times (N is a natural number equal to or larger than 3) at a certain time interval, the electronic device 101 may determine that the user input or interaction on the first sensor 204 or the second sensor 205 is an N-times touch. The N-times touch, among user inputs, may refer to a pressing input applied in a certain position on the first sensor 204 or the second sensor 205 with a lower pressure than a second designated pressure level N times at a certain time interval. Respective touches may be separate inputs.

The swipe front/back 511 in FIG. 5 will now be described in greater detail.

In an embodiment, if the electronic device 101 senses an input swiping the surface of the first sensor 204 and/or the second sensor 205 from the second surface (or rear surface) 202 of the electronic device 101 toward the first surface (or front surface) 201 thereof, the electronic device 101 may determine that the user input or interaction on the first sensor 204 and/or the second sensor 205 is a swipe front 521.

In an embodiment, if the electronic device 101 senses an input swiping the surface of the first sensor 204 or the second sensor 205 from the first surface (or front surface) 201 of the electronic device 101 toward the second surface (or rear surface) 202 thereof, the electronic device 101 may determine that the user input or interaction on the first sensor 204 and/or the second sensor 205 is a swipe back 523.

In an embodiment, an input swiping the surface of the first sensor 204 and/or the second sensor 205 from the second surface (or rear surface) 202 of electronic device 101 toward the first surface (or front surface) 201 thereof or from the first surface (or front surface) 201 of the electronic device 101 toward the second surface (or rear surface) 202 thereof may be a horizontal swipe. The horizontal swipe may include an input swiping the surface of the first sensor 204 and/or the second sensor 205 from the second surface (or rear surface) 202 toward the first surface (or front surface) 201 or from the first surface (or front surface) 201 toward the second surface (or rear surface) 202. The horizontal swipe may include a swipe front 521 and/or a swipe back 523.

In an embodiment, the sensing region of the first sensor 204 may include a front portion adjacent to the first surface 201 and a rear portion adjacent to the second surface 202. The sensing region of the second sensor 205 may include a front portion adjacent to the first surface 201 and a rear portion adjacent to the second surface 202. The swipe front 521 corresponds to a user input swiping the sensing region from the rear portion toward the front portion, and the swipe back 523 corresponds to a user input swiping the sensing region from the front portion toward the rear portion.

The swipe up/down 513 in FIG. 5 will now be described in greater detail.

In an embodiment, if the electronic device 101 senses an input swiping the surface of the first sensor 204 and/or the second sensor 205 from the bottom of the electronic device 101 toward the top thereof (or in the +y direction), the electronic device 101 may determine that the user input or interaction on the first sensor 204 and/or the second sensor 205 is a swipe up 525.

In an embodiment, if the electronic device 101 senses an input swiping the surface of the first sensor 204 or the second sensor 205 from the top of the electronic device 101 toward the bottom thereof (or in the −y direction), the electronic device 101 may determine that the user input or interaction on the first sensor 204 and/or the second sensor 205 is a swipe down 527.

In an embodiment, an input swiping the surface of the first sensor 204 and/or the second sensor 205 from the bottom toward the top (or in the +y direction) or from the top toward the bottom (or in the −y direction) may be a vertical swipe user input. The vertical swipe user input may include an input swiping the surface of the first sensor 204 and/or the second sensor 205 from the bottom toward the top (or in the +y direction) or from the top toward the bottom (or in the −y direction). The vertical swipe user input may include a swipe up 525 and/or a swipe down 527.

In an embodiment, the sensing region of the first sensor 204 may include a top portion adjacent to top (or in the +y direction) and a bottom portion adjacent to the bottom (or in the −y direction). The sensing region of the second sensor 205 may include a top portion adjacent to top (or in the +y direction) and a bottom portion adjacent to the bottom (or in the −y direction). The swipe up 525 corresponds to a user input swiping the sensing region from the bottom portion toward the top portion, and the swipe down 527 corresponds to a user input swiping the sensing region from the top portion toward the bottom portion.

Figure 6:
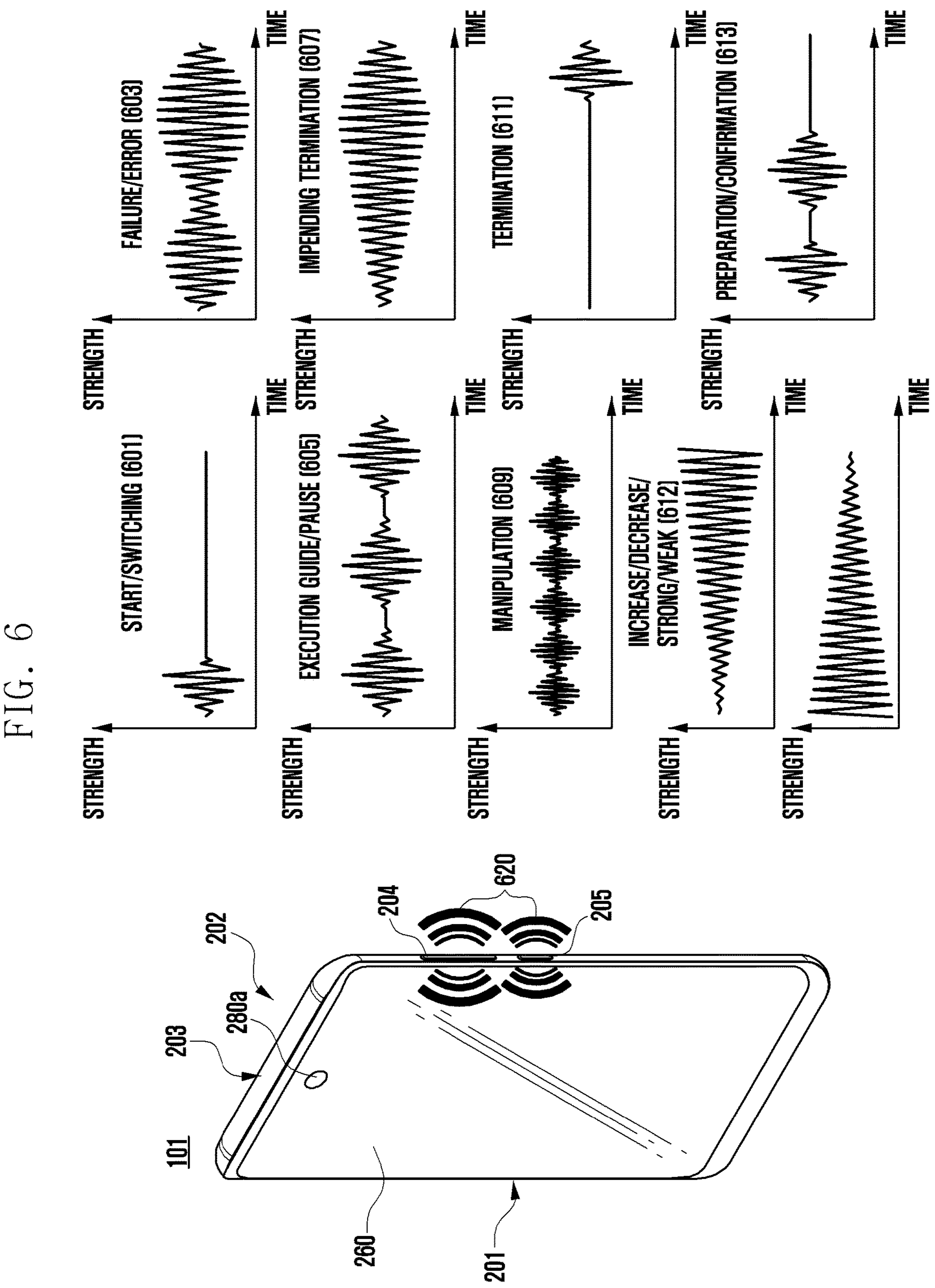
FIG. 6 is a diagram illustrating example haptic feedbacks of an electronic device according to various embodiments.

FIG. 6 is a diagram illustrating various example haptic feedback 620 of an electronic device 101 according to various embodiments.

A first sensor 204 and a second sensor 205 may be disposed on at least a part of the third surface 203. Referring to FIG. 3 and FIG. 4, an actuator 401 may be included below the first sensor 204 and the second sensor 205 or inside the electronic device 101 such that haptic feedbacks can be provided under the control of the processor 120. The actuator 401 may include a piezo actuator, a horizontal motor, a vertical motor, an acoustic plate, a coil motor, and/or a combination thereof.

In an embodiment, the electronic device 101 may output various vibrations or vibration patterns 620 through the actuator 401, based on user inputs to the first sensor 204 and the second sensor 205.

In an embodiment, the vibration of vibration patterns 620 may include patterns regarding a start/switching 601, a failure/error 603, an execution guide/pause 605, an impending termination 607, a manipulation 609, a termination 611, an increase/decrease/strong/weak 612, and a preparation/confirmation 613. In the graphs illustrating vibration patterns 601, 603, 605, 607, 609, 611, 612, and 613, the horizontal axis may denote the time, and the vertical axis may denote the vibration strength.

For example, if image capture starts using at least one camera 280*a* and 280*b*, the electronic device 101 may output the vibration pattern regarding the start/switching 601 through the actuator 401. For example, if the image capture using at least one camera 280*a* and 280*b* is terminated, the electronic device 101 may output the vibration pattern regarding the termination 611 through the actuator 401. For example, if images are captured using at least one camera 280*a* and 280*b* after setting a timer, the electronic device 101 may output the vibration pattern regarding the impending termination 607 through the actuator 401. For example, if images are captured using at least one camera 280*a* and 280*b* after setting a half-pressed shutter function, the electronic device 101 may output the vibration pattern regarding the preparation/confirmation 613 through the actuator 401. For example, if the setting of at least one camera 280*a* and 280*b* is controlled using a swipe up/down or a swipe front/back during a user input, the electronic device 101 may output the vibration pattern regarding the increase/decrease/strong/weak 612 through the actuator 401. For example, if an album application or a gallery application is controlled using a swipe up/down or a swipe front/back during a user input, the electronic device 101 may output the vibration pattern regarding the increase/decrease/strong/weak 612 through the actuator 401.

Figure 7:
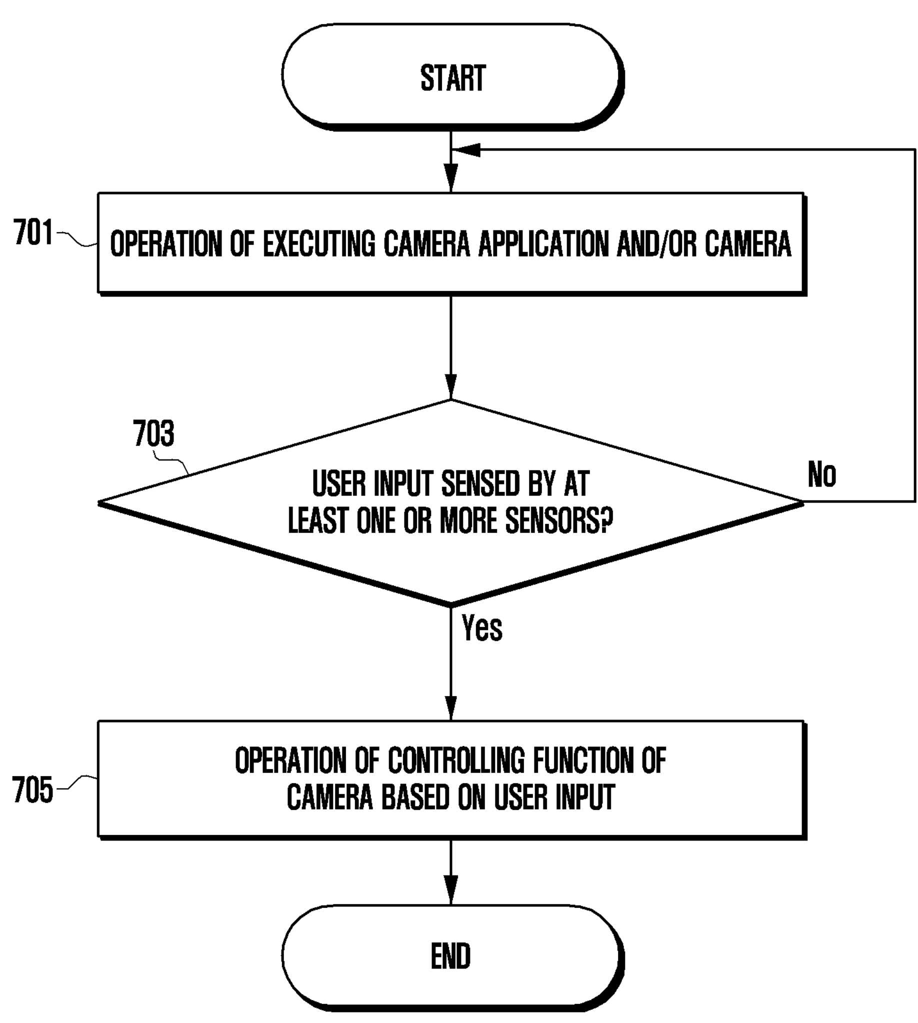
FIG. 7 is a flowchart illustrating an example method of controlling a camera of an electronic device according to various embodiments.

FIG. 7 is a flowchart illustrating an example method of controlling a camera of an electronic device 101 according to various embodiments.

In an embodiment, the memory 130 may store instructions which, when executed by the processor 120, or the processor 120 may be configured to, cause the electronic device 101 to execute the camera control method of the electronic device 101.

In an embodiment, in operation 701, the electronic device 101 may execute a camera (for example, the first camera 280*a* and/or the second camera 280*b*) and/or a camera application under the control of the processor 120.

In an embodiment, in operation 701, if the camera application is executed under the control of the processor 120, the electronic device 101 may execute at least one camera (for example, the first camera 280*a* and the second camera 280*b*).

In an embodiment, in operation 701, if one or more cameras (for example, the first camera 280*a* and the second camera 280*b*) are executed under the control of the processor 120, the electronic device 101 may execute the camera application.

In an embodiment, the camera application may have been prestored in the memory 130 and installed.

For example, the electronic device 101 may display a screen related to the camera application on the display 260. The screen related to the camera application may include a user interface which is used to control at least one camera (for example, the first camera 280*a* and the second camera 280*b*), or which is related to image capture.

In an embodiment, the electronic device 101 may control at least one camera (for example, the first camera 280*a* and the second camera 280*b*) through interactions with the user, based on the user interface of the camera application.

In an embodiment, in operation 703, the electronic device 101 may determine whether user inputs are sensed by at least one sensor (for example, the first sensor 204 and the second sensor 205) while the camera application is executed under the control of the processor 120.

The user inputs are sensed by at least one sensor (for example, the first sensor 204 and the second sensor 205) may be vertical swipe user inputs (for example, swipe up 525 and/or swipe down 527) and/or horizontal swipe user inputs (for example, swipe front 521 and/or swipe back 523).

In an embodiment, in operation 705, the electronic device 101 may control functions of the cameras (for example, the first camera 280*a* and the second camera 280*b*), based on user inputs, while the camera application is executed under the control of the processor 120.

In an embodiment, in operation 705, the electronic device 101 may control the first function of the cameras (for example, the first camera 280*a* and the second camera 280*b*), based on vertical swipe user inputs (for example, swipe up 525 and/or swipe down 527), while the camera application is executed under the control of the processor 120.

In an embodiment, in operation 705, the electronic device 101 may control the second function of the cameras (for example, the first camera 280*a* and the second camera 280*b*), based on horizontal swipe user inputs (for example, swipe front 521 and/or swipe back 523), while the camera application is executed under the control of the processor 120.

In an embodiment, in operation 705, the electronic device 101 may output haptic feedback corresponding to user inputs through the actuator 401 under the control of the processor 120.

For example, if a swipe facing in a first or second direction is sensed on the second sensor 205 as a user input, the electronic device 101 may switch the setting of at least one camera (for example, the first camera 280*a* and the second camera 280*b*) from an automatic image capture mode (for example, PHOTO 812 of FIG. 8) to a manual image capture mode under the control of the processor 120 in operation 705.

For example, if a swipe facing in a first or second direction is sensed on the first sensor 204 or the second sensor 205 as a user input, the electronic device 101 may switch the setting of at least one camera (for example, the first camera 280*a* and the second camera 280*b*) from an automatic image capture mode (for example, PHOTO 812 of FIG. 8) to a manual image capture mode under the control of the processor 120 in operation 705. In an embodiment, in the manual image capture mode, if a double touch 509, a vertical swipe user input (for example, swipe up 525 and/or swipe down 527), or a horizontal swipe user input (for example, swipe front 521 and/or swipe back 523) is sensed, the electronic device 101 may activate a camera setting function under the control of the processor 120.

In an embodiment, in a state in which the camera setting function is activated, the electronic device 101 may deactivate the camera setting function upon sensing a double touch 509, a vertical swipe user input (for example, swipe up 525 and/or swipe down 527), or a horizontal swipe user input (for example, swipe front 521 and/or swipe back 523) under the control of the processor 120 in operation 705.

In an embodiment, upon sensing a vertical swipe user input and/or a horizontal swipe user input while the camera setting function is activated, the electronic device 101 may control one of multiple camera settings (for example, focus, white balance, exposure, shutter speed, and/or ISO) to be selected under the control of the processor 120 in operation 705.

In an embodiment, if one of multiple camera settings (for example, focus, white balance, exposure, shutter speed, and/or ISO) is selected, and if a swipe front 521, a swipe back 523, a swipe up 525, or a swipe down 527 is sensed as a user input, the electronic device 101 may change the camera setting value (for example, focus value, white balance value, exposure value, shutter speed value, and/or ISO value) 851 of the selected camera setting (for example, focus, white balance, exposure, shutter speed, and/or ISO) under the control of the processor 120 in operation 705.

In an embodiment, upon sensing a swipe facing in a third or fourth direction on the first sensor 204 or the second sensor 205 as a user input, the electronic device 101 may switch the camera under the control of the processor 120 in operation 705.

In an embodiment, upon sensing a vertical swipe user input and/or a horizontal swipe user input on the first sensor 204 or the second sensor 205 as a user input, the electronic device 101 may switch the camera under the control of the processor 120 in operation 705.

In an embodiment, upon sensing a swipe facing in a third or fourth direction on the first sensor 204 or the second sensor 205 as a user input, the electronic device 101 may change the magnification of at least one camera (for example, the first camera 280*a* and the second camera 280*b*) under the control of the processor 120 in operation 705.

In an embodiment, upon sensing a vertical swipe user input and/or a horizontal swipe user input on the first sensor 204 or the second sensor 205 as a user input, the electronic device 101 may change the magnification of at least one camera (for example, the first camera 280*a* and the second camera 280*b*) under the control of the processor 120 in operation 705.

In an embodiment, in a state in which the focus setting among the multiple camera settings is selected, if a swipe front 521, a swipe back 523, a swipe up 525, or a swipe down 527 is sensed on the first sensor 204 or the second sensor 205 as a user input, the electronic device 101 may select one of a center focus, a multi-focus, or a manual focus under the control of the processor 120 in operation 705.

In an embodiment, in a state in which the focus setting among the multiple camera settings is selected, if a vertical swipe user input and/or a horizontal swipe user input is sensed on the first sensor 204 or the second sensor 205, the electronic device 101 may select one of a center focus, a multi-focus, or a manual focus under the control of the processor 120 in operation 705.

In an embodiment, upon sensing a user input having a pressure higher than a first pressure level with regard to the first sensor 204 or the second region 204*b*, the electronic device 101 may control at least one camera (for example, the first camera 280*a* and the second camera 280*b*) so as to maintain the focus on the subject under the control of the processor 120 in operation 705.

In an embodiment, upon sensing a user input having a pressure higher than a second pressure level with regard to the first sensor 204 or the second region 204*b* while performing a focus lock function, the electronic device 101 may capture images using at least one camera (for example, the first camera 280*a* and the second camera 280*b*) under the control of the processor 120 in operation 705.

In an embodiment, upon sensing a swipe front 521, a swipe back 523, a swipe up 525, or a swipe down 527 on the first sensor 204 or the second region 204*b* as a user input, the electronic device 101 may change the focus region of at least one camera (for example, the first camera 280*a* and the second camera 280*b*) under the control of the processor 120 in operation 705.

In an embodiment, upon sensing a vertical swipe user input and/or a horizontal swipe user input on the first sensor 204 or the second region 204*b* as a user input, the electronic device 101 may change the focus region of at least one camera (for example, the first camera 280*a* and the second camera 280*b*) under the control of the processor 120 in operation 705.

In an embodiment, upon sensing a swipe front 521, a swipe back 523, a swipe up 525, or a swipe down 527 on the first sensor 204 or the second region 204*b* as a user input, the electronic device 101 may control the focus value to be changed under the control of the processor 120 in operation 705.

In an embodiment, upon sensing a vertical swipe user input and/or a horizontal swipe user input on the first sensor 204 or the second region 204*b* as a user input, the electronic device 101 may control the focus value to be changed under the control of the processor 120 in operation 705.

In an embodiment, upon sensing a swipe front 521 or a swipe back 523 on the first sensor 204 or the second sensor 205 as a user input, the electronic device 101 may switch the tap of the gallery application to one of a photo tab, an album tab, or a story tab under the control of the processor 120 in operation 705.

In an embodiment, upon sensing a vertical swipe user input and/or a horizontal swipe user input on the first sensor 204 or the second sensor 205, the electronic device 101 may switch the tap of the gallery application to one of a photo tab, an album tab, or a story tab under the control of the processor 120 in operation 705.

In an embodiment, upon sensing a swipe up 525 or a swipe down 527 on the first sensor 204 or the second sensor 205 as a user input, the electronic device 101 may control stored image and/or video items to be scrolled and displayed under the control of the processor 120 in operation 705.

In an embodiment, upon sensing a vertical swipe user input and/or a horizontal swipe user input on the first sensor 204 or the second sensor 205, the electronic device 101 may control stored image and/or video items to be scrolled and displayed under the control of the processor 120 in operation 705.

In an embodiment, upon sensing a swipe up 525 or a swipe down 527 on the first sensor 204 or the second sensor 205 as a user input, the electronic device 101 may rotate an image selected on an image editing application under the control of the processor 120 in operation 705.

In an embodiment, upon sensing a vertical swipe user input and/or a horizontal swipe user input on the first sensor 204 or the second sensor 205, the electronic device 101 may rotate an image selected on an image editing application under the control of the processor 120 in operation 705.

In an embodiment, upon sensing a swipe up 525 or a swipe down 527 on the first sensor 204 or the second sensor 205 as a user input, the electronic device 101 may change the filter value of an image editing application under the control of the processor 120 in operation 705.

In an embodiment, upon sensing a vertical swipe user input and/or a horizontal swipe user input on the first sensor 204 or the second sensor 205, the electronic device 101 may change the filter value of an image editing application under the control of the processor 120 in operation 705.

Figure 8:
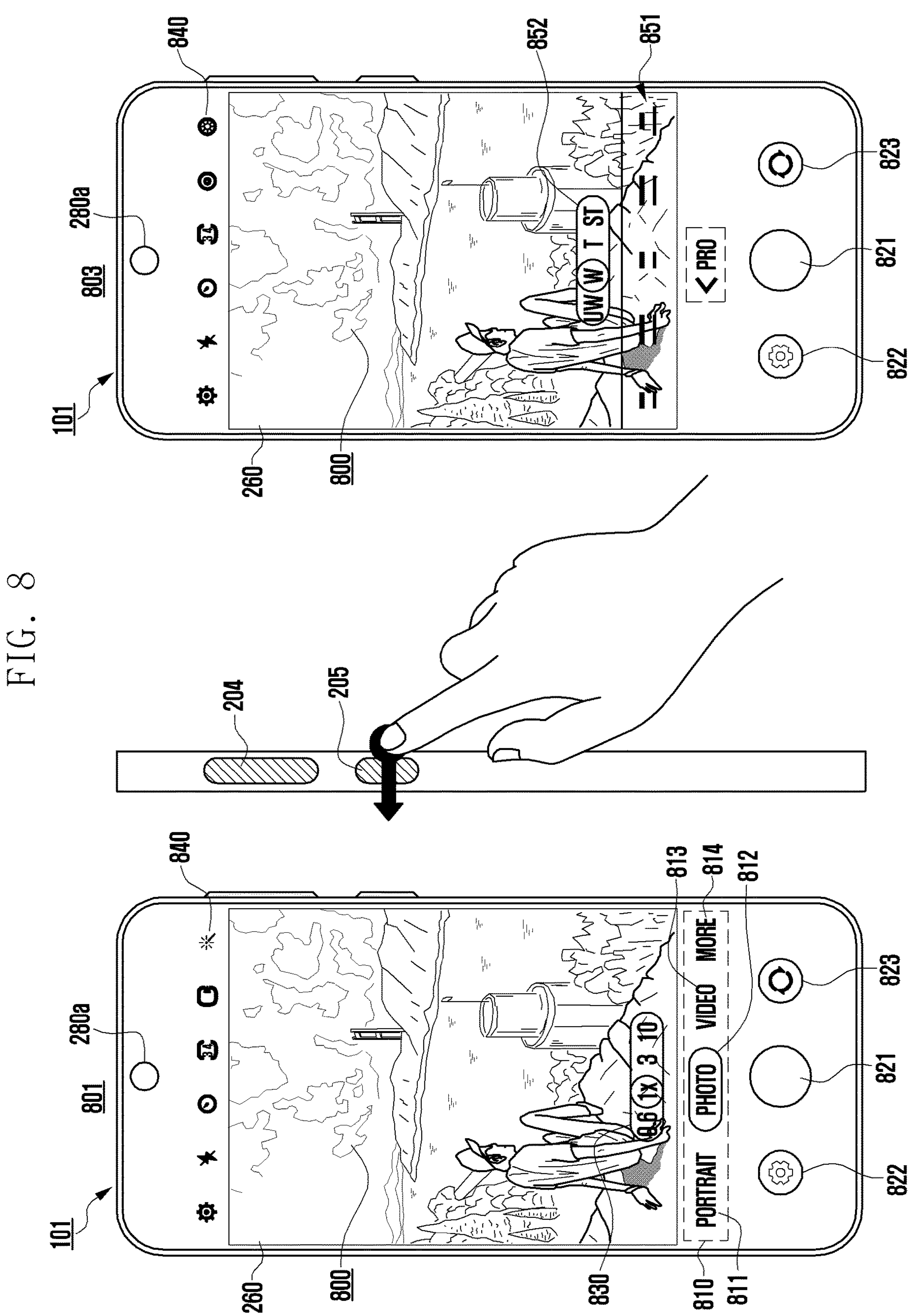
FIG. 8 is a diagram illustrating an example camera control method according to a user input according to various embodiments.

FIG. 8 is a diagram illustrating an example camera control method according to a user input according to various embodiments.

Referring to the screen 801, the electronic device 101 may execute at least one camera (for example, a first camera 280*a* and a second camera 280*b*).

If at least one camera (for example, the first camera 280*a* and the second camera 280*b*) are executed on the screen 801, the electronic device 101 may display an image 800 which is being acquired or has been acquired through the at least one camera (for example, the first camera 280*a* and the second camera 280*b*) on the display 260 through a camera application.

On the screen 801, the electronic device 101 may display an image 800 which is being acquired or has been acquired through the at least one camera (for example, the first camera 280*a* and the second camera 280*b*) on the display 260 through a camera application.

On the screen 801, the camera application may display an image capture mode 810 as a user interface on the display 260. The image capture mode 810 may include, for example, portrait 811, photo 812, video 813, and/or other image capture modes 814 (indicated by "more" on the screen 801).

In an embodiment, if the portrait 811 is selected as the image capture mode, the electronic device 101 may control the at least one camera (for example, the first camera 280*a* and the second camera 280*b*) such that the image aspect ratio is controlled, thereby acquiring an image having a larger vertical size than the horizontal size.

In an embodiment, if the photo 812 is selected as the image capture mode, the electronic device 101 may capture images by controlling the at least one camera (for example, the first camera 280*a* and the second camera 280*b*) according to a preset camera setting value (for example, focus value, white balance value, exposure value, shutter speed value, and/or ISO value).

In an embodiment, if the video 813 is selected as the image capture mode, the electronic device 101 may acquire videos by controlling the at least one camera (for example, the first camera 280*a* and the second camera 280*b*).

In an embodiment, the camera application may include an image capture shutter 821, a gallery 822, and camera switching 823 as user interfaces.

In an embodiment, if the image capture shutter 821 is selected, the electronic device 101 may control the at least one camera (for example, the first camera 280*a* and the second camera 280*b*) so as to acquire the image 800 currently displayed on the display 260 or capture a video thereof.

In an embodiment, if the gallery 822 is selected, the electronic device 101 may execute an album application or a gallery application. If the album application or gallery application is executed, stored images and/or videos may be displayed as items. When images and/or videos stored in the album application or gallery application are displayed as items, representative images or reduced images of the stored images and/or videos may be displayed.

In an embodiment, if the camera switching 823 is selected, the electronic device 101 may acquire the image which has been acquired through the second camera 280*b* disposed on the second surface 202 through the first camera 280*a* disposed on the first surface 201.

In an embodiment, if the camera switching 823 is selected, the electronic device 101 may acquire the image which has been acquired through the first camera 280*a* disposed on the first surface 201 through the second camera 280*b* disposed on the second surface 202.

In an embodiment, the camera application may include a magnification 830 as a user interface. The electronic device 101 may control the at least one camera (for example, the first camera 280*a* and the second camera 280*b*), based on a selected magnification 830, thereby acquiring videos and/or images. The magnification 830 may include, for example, 0.6×, 1×, 3×, and 10×. The electronic device 101 may change cameras or lenses, based on the selected magnification 830.

In an embodiment, the camera application may include camera control 840 as a user interface. The camera control 840 may include interfaces regarding a flash setting, a timer setting, and a filter setting.

Referring to the screen 801, the electronic device 101 may sense a swipe facing in a first or second direction on the second sensor 205 as a user input. The electronic device 101 may output a haptic feedback regarding the swipe facing in the first or second direction on the second sensor 205 through the actuator 401.

Referring to the screen 801, the electronic device 101 may sense a horizontal swipe (for example, swipe front and/or swipe back) on the second sensor 205 as a user input. The electronic device 101 may output a haptic feedback regarding the horizontal swipe (for example, swipe front and/or swipe back) on the second sensor 205 through the actuator 401.

In an embodiment, the electronic device 101 may sense a vertical swipe user input (for example, swipe up and/or swipe down) and/or a horizontal swipe user input (for example, swipe front and/or swipe back) on the second sensor 205. The electronic device 101 may output haptic feedbacks regarding the vertical swipe user input (for example, swipe up and/or swipe down) and/or the horizontal swipe user input (for example, swipe front and/or swipe back) on the second sensor 205 through the actuator 401.

Referring to the screen 803, upon sensing a swipe facing in a first or second direction on the second sensor 205 as a user input, the electronic device 101 may switch the setting of the at least one camera (for example, the first camera 280*a* and the second camera 280*b*) from an automatic image capture mode (for example, photo 812) to a manual image capture mode.

Referring to the screen 803, upon sensing a horizontal swipe (for example, swipe front and/or swipe back) on the second sensor 205 as a user input, the electronic device 101 may switch the setting of the at least one camera (for example, the first camera 280*a* and the second camera 280*b*) from an automatic image capture mode (for example, photo 812) to a manual image capture mode.

In an embodiment, upon sensing a vertical swipe user input (for example, swipe up and/or swipe down) and/or a horizontal swipe user input (for example, swipe front and/or swipe back) on the first sensor 204 and/or the second sensor 205, the electronic device 101 may switch the setting of the at least one camera (for example, the first camera 280*a* and the second camera 280*b*) from an automatic image capture mode (for example, photo 812) to a manual image capture mode.

In an embodiment, the first direction may be directed from the second surface 202 of the electronic device 101 toward the first surface 201 thereof. The second direction may be directed from the first surface 201 of the electronic device 101 toward the second surface 202 thereof. Referring to FIG. 5, a swipe facing in the first direction may be the swipe front 521, and a swipe facing in the second direction may be the swipe back 523.

In an embodiment, in the manual image capture mode, the electronic device 101 may capture images by controlling the at least one camera (for example, the first camera 280*a* and the second camera 280*b*) according to a camera setting value (for example, focus value, white balance value, exposure value, shutter speed value, and/or ISO value) selected by the user. The camera application may include camera setting values (for example, focus value, white balance value, exposure value, shutter speed value, and/or ISO value) as user interfaces. In the manual image capture mode, the electronic device 101 may capture images by controlling the at least one camera (for example, the first camera 280*a* and the second camera 280*b*) according to a lens (for example, telephoto lens or wide-angle lens) selected by the user. The camera application may include a user interface 852 regarding lens selection.

In an embodiment, in the manual image capture mode, the electronic device 101 may activate the camera setting function upon sensing a double touch 509 on the first sensor 204 or the second sensor 205 under the control of the processor 120. The electronic device 101 may output a haptic feedback regarding the double touch 509 on the first sensor 204 or the second sensor 205 through the actuator 401.

In an embodiment, in the manual image capture mode, the electronic device 101 may activate the camera setting function upon sensing a double touch 509, a vertical swipe user input (for example, swipe up and/or swipe down) and/or a horizontal swipe user input (for example, swipe front and/or swipe back) on the first sensor 204 or the second sensor 205 under the control of the processor 120. The electronic device 101 may output haptic feedbacks regarding the double touch 509, the vertical swipe user input (for example, swipe up and/or swipe down) and/or the horizontal swipe user input (for example, swipe front and/or swipe back) through the actuator 401.

In an embodiment, in a state in which the camera setting function is activated, the electronic device 101 may deactivate the camera setting function upon sensing a double touch 509 on the first sensor 204 or the second sensor 205 under the control of the processor 120.

In an embodiment, in a state in which the camera setting function is activated, the electronic device 101 may deactivate the camera setting function upon sensing a double touch 509, a vertical swipe user input (for example, swipe up and/or swipe down) and/or a horizontal swipe user input (for example, swipe front and/or swipe back) on the first sensor 204 or the second sensor 205 under the control of the processor 120.

In an embodiment, if the camera setting function is activated, the electronic device 101 may control one of multiple camera settings (for example, focus, white balance, exposure, shutter speed, and/or ISO) to be selected under the control of the processor 120 upon sensing a swipe front 521, a swipe back 523, a swipe up 525, and/or a swipe down 527 on the first sensor 204 or the second sensor 205 as a user input. The electronic device 101 may putout haptic feedbacks regarding the swipe front 521, the swipe back 523, the swipe up 525, and/or the swipe down 527 on the first sensor 204 or the second sensor 205 through the actuator 401.

In an embodiment, if the camera setting function is activated, the electronic device 101 may control one of multiple camera settings (for example, focus, white balance, exposure, shutter speed, and/or ISO) to be selected under the control of the processor 120 upon sensing a vertical swipe user input (for example, swipe up and/or swipe down) and/or a horizontal swipe user input (for example, swipe front and/or swipe back) on the first sensor 204 or the second sensor 205. The electronic device 101 may putout haptic feedbacks regarding the vertical swipe user input (for example, swipe up and/or swipe down) and/or the horizontal swipe user input (for example, swipe front and/or swipe back) through the actuator 401.

In an embodiment, in a state in which one of the multiple camera settings (for example, focus, white balance, exposure, shutter speed, and/or ISO) is selected, the electronic device 101 may change the camera setting value (for example, focus value, white balance value, exposure value, shutter speed value, and/or ISO value) 851 of the selected camera setting (for example, focus, white balance, exposure, shutter speed, and/or ISO) upon sensing a swipe front 521, a swipe back 523, a swipe up 525, or a swipe down 527 on the first sensor 204 or the second sensor 205 as a user input under the control of the processor 120.

In an embodiment, in a state in which one of the multiple camera settings (for example, focus, white balance, exposure, shutter speed, and/or ISO) is selected, the electronic device 101 may change the camera setting value (for example, focus value, white balance value, exposure value, shutter speed value, and/or ISO value) 851 of the selected camera setting (for example, focus, white balance, exposure, shutter speed, and/or ISO) upon sensing a vertical swipe user input (for example, swipe up and/or swipe down) and/or a horizontal swipe user input (for example, swipe front and/or swipe back) on the first sensor 204 or the second sensor 205 under the control of the processor 120.

For example, in a state in which the exposure among the multiple camera settings is selected, the electronic device 101 may increase the exposure value upon sensing a swipe up 525 on the first sensor 204 or the second sensor 205 as a user input under the control of the processor 120. The electronic device 101 may output a haptic feedback (for example, increase 612) regarding the swipe up 525 on the first sensor 204 or the second sensor 205 through the actuator 401.

For example, in a state in which the exposure among the multiple camera settings is selected, the electronic device 101 may decrease the exposure value upon sensing a swipe down 527 on the first sensor 204 or the second sensor 205 as a user input under the control of the processor 120. The electronic device 101 may output a haptic feedback (for example, decrease 612) regarding the swipe down 527 on the first sensor 204 or the second sensor 205 through the actuator 401.

Figure 9:
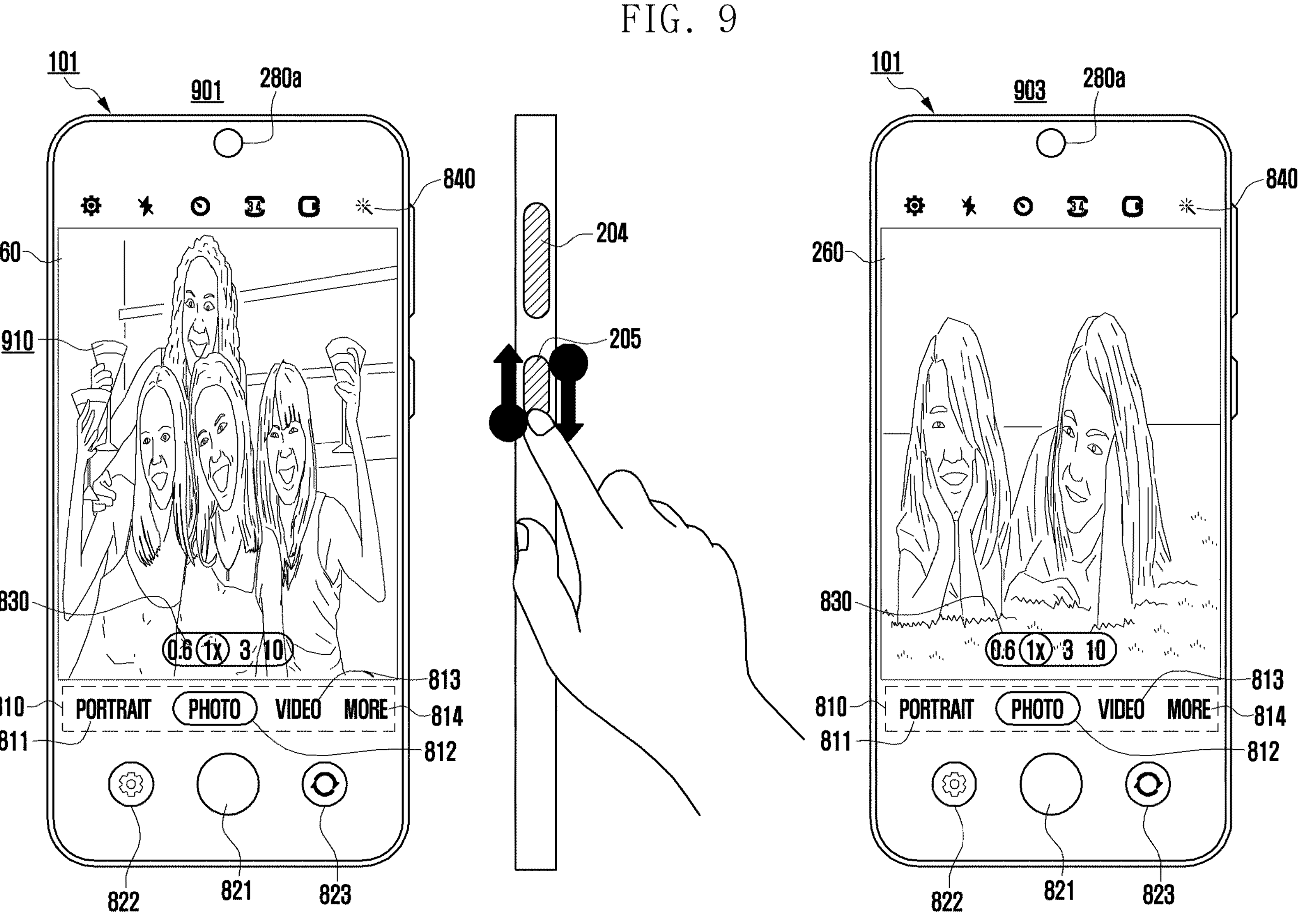
FIG. 9 is a diagram illustrating an example camera control method according to a user input according to various embodiments.

FIG. 9 is a diagram illustrating an example camera control method according to a user input according to various embodiments.

In the following description with reference to FIG. 9, descriptions overlapping those in FIG. 8 may not be repeated.

Referring to the screen 901, the electronic device 101 may execute at least one camera (for example, a first camera 280*a* and a second camera 280*b*).

If at least one camera (for example, the first camera 280*a* and the second camera 280*b*) are executed on the screen 901, the electronic device 101 may display an image 910 which is being acquired or has been acquired through the at least one camera (for example, the first camera 280*a* and the second camera 280*b*) on the display 260 through a camera application.

On the screen 901, the electronic device 101 may display an image 910 which is being acquired or has been acquired through the at least one camera (for example, the first camera 280*a* and the second camera 280*b*) on the display 260 through a camera application.

Referring to the screen 901, the electronic device 101 may sense a swipe facing in a third or fourth direction on the second sensor 205 as a user input. The electronic device 101 may output a haptic feedback corresponding to the swipe facing in the third or fourth direction on the second sensor 205 through the actuator 401.

Referring to the screen 901, the electronic device 101 may sense a vertical swipe user input (for example, swipe up and/or swipe down) on the second sensor 205. The electronic device 101 may output a haptic feedback corresponding to the vertical swipe user input (for example, swipe up and/or swipe down) through the actuator 401.

In an embodiment, the electronic device 101 may sense a vertical swipe user input (for example, swipe up and/or swipe down) and/or a horizontal swipe user input (for example, swipe front and/or swipe back) on the first sensor 204 and/or the second sensor 205. The electronic device 101 may output haptic feedbacks corresponding to the vertical swipe user input (for example, swipe up and/or swipe down) and/or the horizontal swipe user input (for example, swipe front and/or swipe back) through the actuator 401.

Referring to the screen 903, upon sensing a swipe facing in a third or fourth direction on the second sensor 205 as a user input, the electronic device 101 may switch cameras under the control of the processor 120. For example, the electronic device 101 may acquire the image which has been acquired through the second camera 280*b* disposed on the second surface 202 through the first camera 280*a* disposed on the first surface 201. For example, the electronic device 101 may acquire the image which has been acquired through the first camera 280*a* disposed on the first surface 201 through the second camera 280*b* disposed on the second surface 202.

Referring to the screen 903, upon sensing a vertical swipe user input (for example, swipe up and/or swipe down) on the second sensor 205, the electronic device 101 may switch cameras under the control of the processor 120. For example, the electronic device 101 may acquire the image which has been acquired through the second camera 280*b* disposed on the second surface 202 through the first camera 280*a* disposed on the first surface 201. For example, the electronic device 101 may acquire the image which has been acquired through the first camera 280*a* disposed on the first surface 201 through the second camera 280*b* disposed on the second surface 202.

In an embodiment, upon sensing a vertical swipe user input (for example, swipe up and/or swipe down) and/or a horizontal swipe user input (for example, swipe front and/or swipe back) on the first sensor 204 and/or the second sensor 205, the electronic device 101 may switch cameras under the control of the processor 120. For example, the electronic device 101 may acquire the image which has been acquired through the second camera 280*b* disposed on the second surface 202 through the first camera 280*a* disposed on the first surface 201. For example, the electronic device 101 may acquire the image which has been acquired through the first camera 280*a* disposed on the first surface 201 through the second camera 280*b* disposed on the second surface 202. In an embodiment, the third direction may be directed from the bottom of the electronic device 101 toward top thereof (or in the +y direction). The fourth direction may be directed from the top of the electronic device 101 toward the bottom thereof (or in the −y direction). Referring to FIG. 5, a swipe facing in the third direction may be the swipe up 525, and a swipe facing in the fourth direction may be the swipe down 527.

Figure 10:
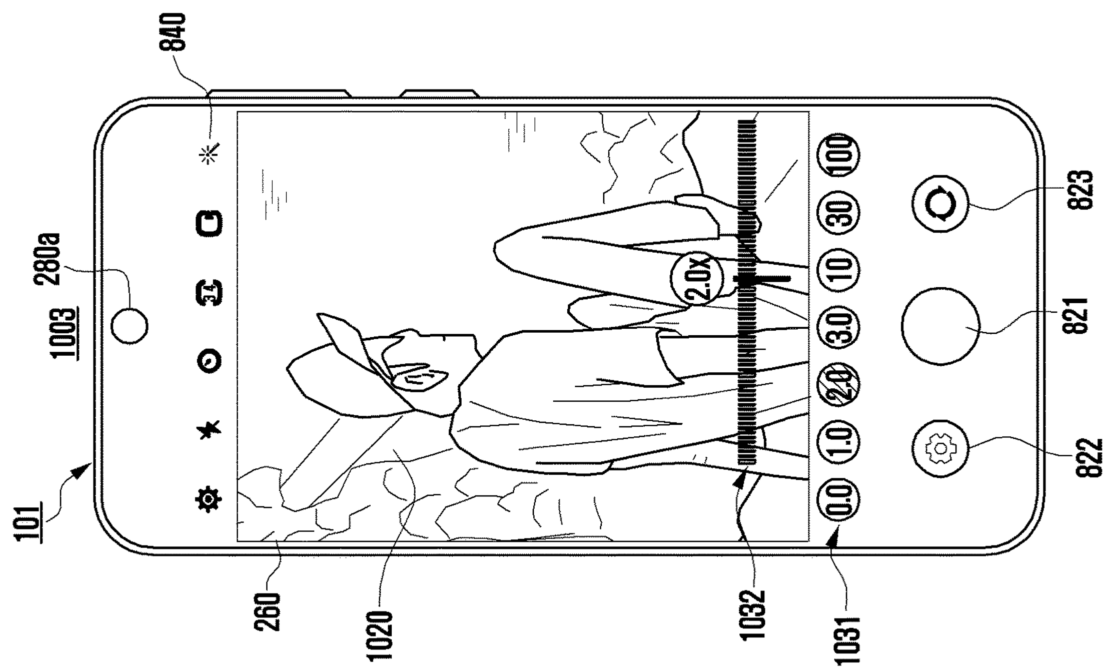
FIG. 10 is a diagram illustrating an example camera control method according to a user input according to various embodiments.
Figure 10:
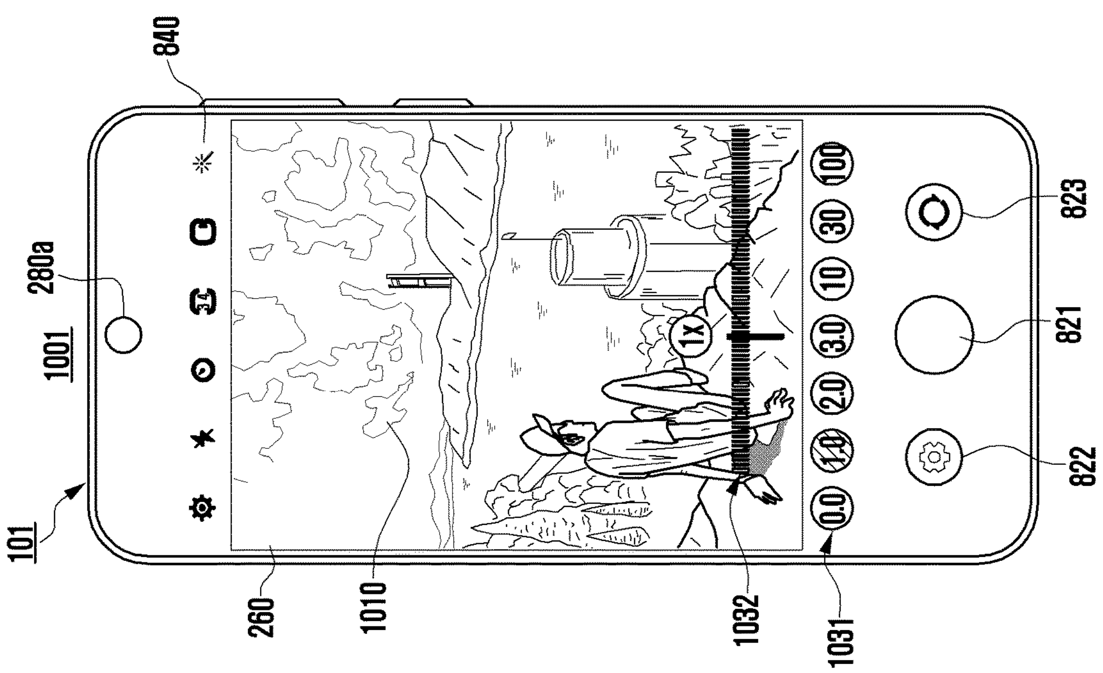

FIG. 10 is a diagram illustrating an example camera control method according to a user input according to various embodiments.

In the following description with reference to FIG. 10, descriptions overlapping those in FIG. 8 and FIG. 9 may not be repeated.

Referring to the screen 1001, the electronic device 101 may execute at least one camera (for example, a first camera 280*a* and a second camera 280*b*).

If at least one camera (for example, the first camera 280*a* and the second camera 280*b*) are executed on the screen 1001, the electronic device 101 may display an image 1010 which is being acquired or has been acquired through the at least one camera (for example, the first camera 280*a* and the second camera 280*b*) on the display 260 through a camera application.

On the screen 1001, the electronic device 101 may display an image 1010 which is being acquired or has been acquired through the at least one camera (for example, the first camera 280*a* and the second camera 280*b*) on the display 260 through a camera application.

Referring to the screen 1001, the electronic device 101 may sense a swipe facing in a third or fourth direction on the first sensor 204 as a user input. The electronic device 101 may output a haptic feedback corresponding to the swipe facing in the third or fourth direction on the first sensor 204 through the actuator 401.

Referring to the screen 1001, the electronic device 101 may sense a vertical swipe user input (for example, swipe up and/or swipe down) on the first sensor 204. The electronic device 101 may output a haptic feedback corresponding to the vertical swipe user input (for example, swipe up and/or swipe down) through the actuator 401.

In an embodiment, the electronic device 101 may sense a vertical swipe user input (for example, swipe up and/or swipe down) and/or a horizontal swipe user input (for example, swipe front and/or swipe back) on the first sensor 204 and/or the second sensor 205. The electronic device 101 may output haptic feedbacks corresponding to the vertical swipe user input (for example, swipe up and/or swipe down) and/or the horizontal swipe user input (for example, swipe front and/or swipe back) through the actuator 401.

Referring to the screen 1003, upon sensing a swipe facing in a third or fourth direction on the first sensor 204 as a user input, the electronic device 101 may change the magnification of at least one camera (for example, the first camera 280*a* and the second camera 280*b*) under the control of the processor 120. The camera application may include a user interface 1031 regarding the current magnification information and a slider user interface 1032 regarding the magnification. Upon sensing a swipe facing in a third or fourth direction on the first sensor 204 as a user input, the electronic device 101 may change the magnification of at least one camera (for example, the first camera 280*a* and the second camera 280*b*) under the control of the processor 120, and may display a magnification-changed image 1020 on the display 260.

Referring to the screen 1003, upon sensing a vertical swipe user input (for example, swipe up and/or swipe down) on the first sensor 204, the electronic device 101 may change the magnification of at least one camera (for example, the first camera 280*a* and the second camera 280*b*) under the control of the processor 120. The camera application may include a user interface 1031 regarding the current magnification information and a slider user interface 1032 regarding the magnification. Upon sensing a vertical swipe user input (for example, swipe up and/or swipe down) on the first sensor 204, the electronic device 101 may change the magnification of at least one camera (for example, the first camera 280*a* and the second camera 280*b*) under the control of the processor 120, and may display a magnification-changed image 1020 on the display 260.

In an embodiment, upon sensing a vertical swipe user input (for example, swipe up and/or swipe down) and/or a horizontal swipe user input (for example, swipe front and/or swipe back) on the first sensor 204 and/or the second sensor 205, the electronic device 101 may change the magnification of at least one camera (for example, the first camera 280*a* and the second camera 280*b*) under the control of the processor 120. The camera application may include a user interface 1031 regarding the current magnification information and a slider user interface 1032 regarding the magnification. Upon sensing a vertical swipe user input (for example, swipe up and/or swipe down) and/or a horizontal swipe user input (for example, swipe front and/or swipe back) on the first sensor 204 and/or the second sensor 205, the electronic device 101 may change the magnification of at least one camera (for example, the first camera 280*a* and the second camera 280*b*) under the control of the processor 120, and may display a magnification-changed image 1020 on the display 260.

Figure 11:
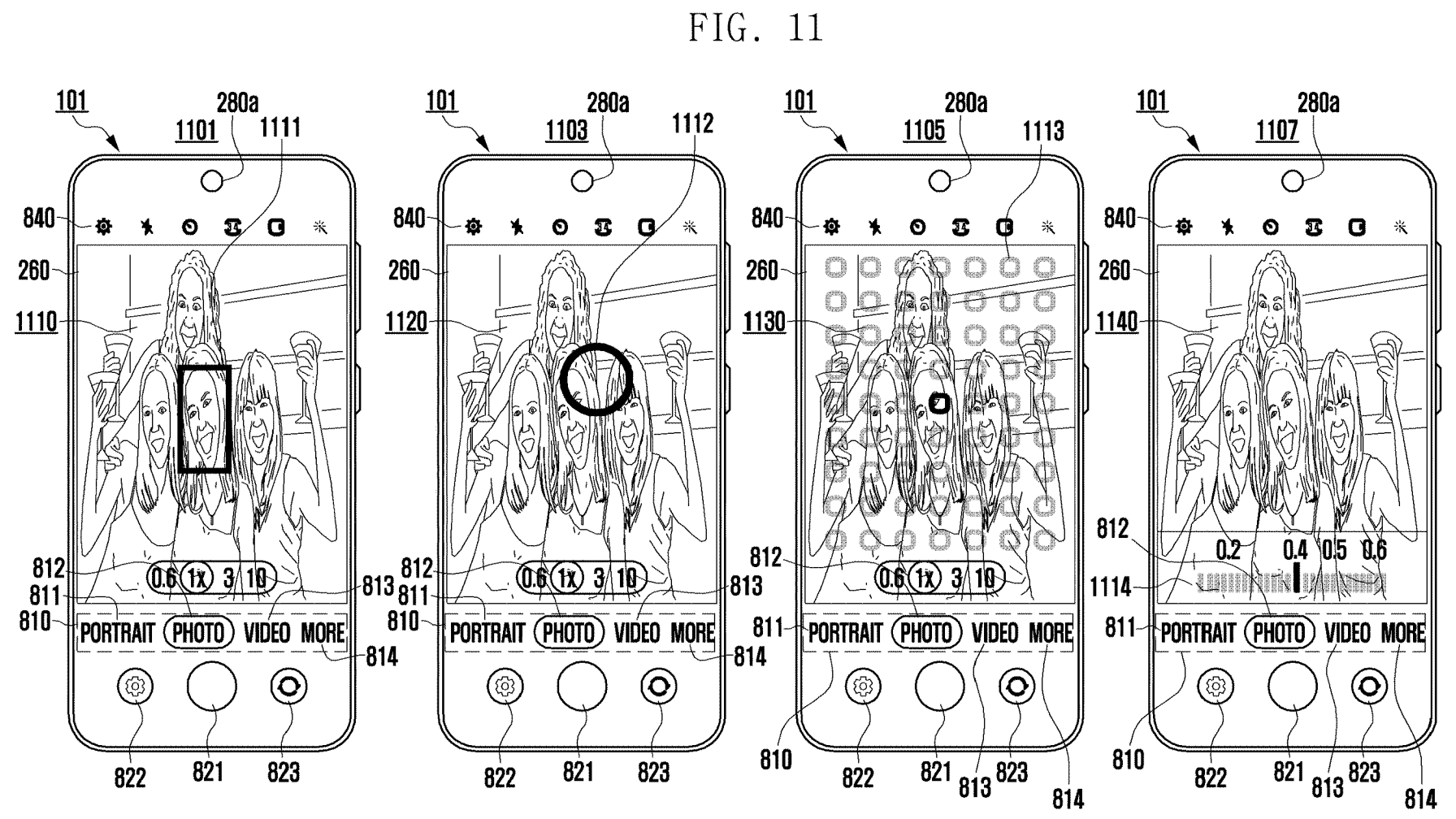

FIG. 11 is a diagram illustrating an example focus setting method of an electronic device 101 according to various embodiments.

In the following description with reference to FIG. 11, descriptions overlapping those in FIG. 8, FIG. 9, and FIG. 10 may not be repeated.

On the screen 1101, when in an automatic image capture mode, the electronic device 101 may activate a human figure autofocusing function under the control of the processor 120. The electronic device 101 may distinguish a human figure in the currently acquired image 1110 and may display a focus-related user interface 1111 above the distinguished human figure.

In an embodiment, when in a manual image capture mode, the electronic device 101 may change the focus setting according to a user input on the first sensor 204 or the second region 204*b* under the control of the processor 120. The electronic device 101 may output a haptic feedback corresponding to the user input on the first sensor 204 or the second region 204*b* through the actuator 401.

In an embodiment, in a state in which the focus setting is selected from multiple camera settings (for example, focus, white balance, exposure, shutter speed, and/or ISO), the electronic device 101 may select one of a center focus, a multi-focus, or a manual focus upon sensing a swipe front 521, a swipe back 523, a swipe up 525, or a swipe down 527 on the first sensor 204 or the second region 204*b* as a user input under the control of the processor 120.

In an embodiment, in a state in which the focus setting is selected from multiple camera settings (for example, focus, white balance, exposure, shutter speed, and/or ISO), the electronic device 101 may select one of a center focus, a multi-focus, or a manual focus upon sensing a vertical swipe user input (for example, swipe up and/or swipe down) and/or a horizontal swipe user input (for example, swipe front and/or swipe back) on the first sensor 204 and/or the second region 204*b* under the control of the processor 120.

Referring to the screen 1103, if the center focus is selected from the focus settings by a user input on the first sensor 204 or the second region 204*b*, the electronic device 101 may display a user interface 1112 regarding the center focus of the currently acquired image 1120 under the control of the processor 120.

In an embodiment, if the center focus is selected from the focus settings by a user input on the first sensor 204 and/or the second sensor 205, the electronic device 101 may display a user interface 1112 regarding the center focus of the currently acquired image 1120 under the control of the processor 120.

Referring to the screen 1105, if the multi-focus is selected from the focus settings by a user input on the first sensor 204 or the second region 204*b*, the electronic device 101 may display a user interface 1113 regarding the multi-focus of the currently acquired image 1130 under the control of the processor 120.

In an embodiment, if the multi-focus is selected from the focus settings by a user input on the first sensor 204 and/or the second sensor 205, the electronic device 101 may display a user interface 1112 regarding the multi-focus of the currently acquired image 1120 under the control of the processor 120.

Referring to the screen 1107, if the manual focus is selected from the focus settings by a user input on the first sensor 204 or the second region 204*b*, the electronic device 101 may display a user interface 1114 regarding the manual focus of the currently acquired image 1140 under the control of the processor 120. The user interface 1114 regarding the manual focus may include a user interface regarding a slider.

In an embodiment, if the manual focus is selected from the focus settings by a user input on the first sensor 204 and/or the second sensor 205, the electronic device 101 may display a user interface 1114 regarding the manual focus of the currently acquired image 1140 under the control of the processor 120. The user interface 1114 regarding the manual focus may include a user interface regarding a slider.

Figure 12:
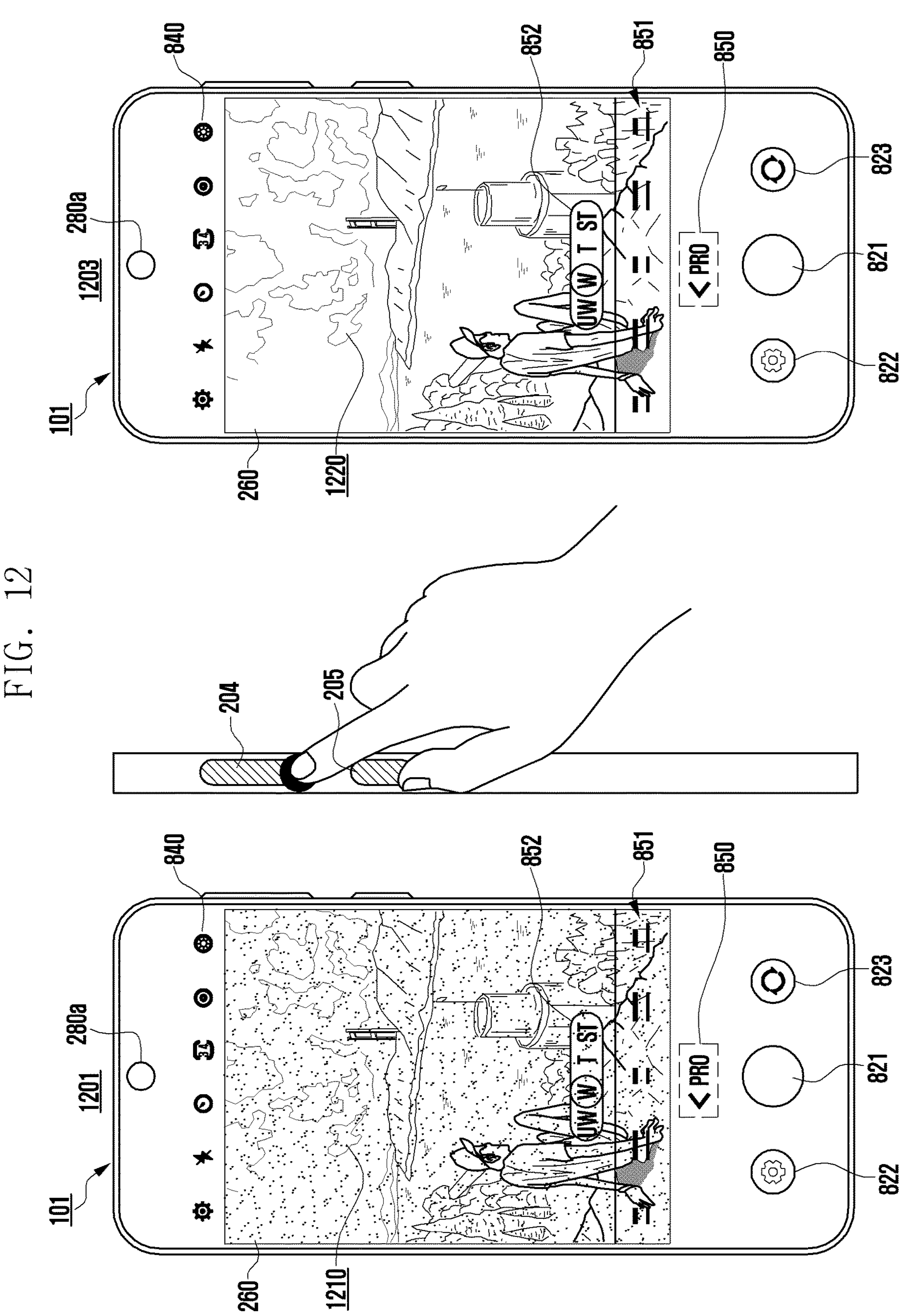
FIG. 12 is a diagram illustrating an example camera control method of an electronic device according to various embodiments.

FIG. 12 is a diagram illustrating an example camera control method of an electronic device 101 according to various embodiments.

In the following description with reference to FIG. 12, descriptions overlapping those in FIG. 8, FIG. 9, FIG. 10, and FIG. 11 may not be repeated.

On the screen 1201, upon sensing a user input having a higher pressure than a first pressure level with regard to the first sensor 204 or the second region 204*b*, the electronic device 101 may control at least one camera (for example, the first camera 280*a* and the second camera 280*b*) so as to maintain the focus on the subject 1210 under the control of the processor 120. For example, the operation of controlling the at least one camera (for example, the first camera 280*a* and the second camera 280*b*) so as to maintain the focus on the subject may be focus lock function. The electronic device 101 may output a haptic feedback regarding the user input having a higher pressure than a first pressure level with regard to the first sensor 204 or the second region 204*b* through the actuator 401.

In an embodiment, upon sensing a user input having a higher pressure than a first pressure level with regard to the first sensor 204 and/or the second sensor 205, the electronic device 101 may control at least one camera (for example, the first camera 280*a* and the second camera 280*b*) so as to maintain the focus on the subject 1210 under the control of the processor 120. For example, the operation of controlling the at least one camera (for example, the first camera 280*a* and the second camera 280*b*) so as to maintain the focus on the subject may be focus lock function. The electronic device 101 may output a haptic feedback regarding the user input having a higher pressure than a first pressure level with regard to the first sensor 204 and/or the second sensor 205 through the actuator 401.

On the screen 1203, upon sensing a user input having a higher pressure than a second pressure level with regard to the first sensor 204 or the second region 204*b* while performing the focus lock function, the electronic device 101 may capture an image 1220 using at least one camera (for example, the first camera 280*a* and the second camera 280*b*) under the control of the processor 120. The electronic device 101 may output a haptic feedback regarding the user input having a higher pressure than a second pressure level with regard to the first sensor 204 or the second region 204*b* through the actuator 401.

In an embodiment, upon sensing a user input having a higher pressure than a second pressure level with regard to the first sensor 204 and/or the second sensor 204 while performing the focus lock function, the electronic device 101 may capture an image 1220 using at least one camera (for example, the first camera 280*a* and the second camera 280*b*) under the control of the processor 120. The electronic device 101 may output a haptic feedback regarding the user input having a higher pressure than a second pressure level with regard to the first sensor 204 and/or the second sensor 204 through the actuator 401.

Figure 13:
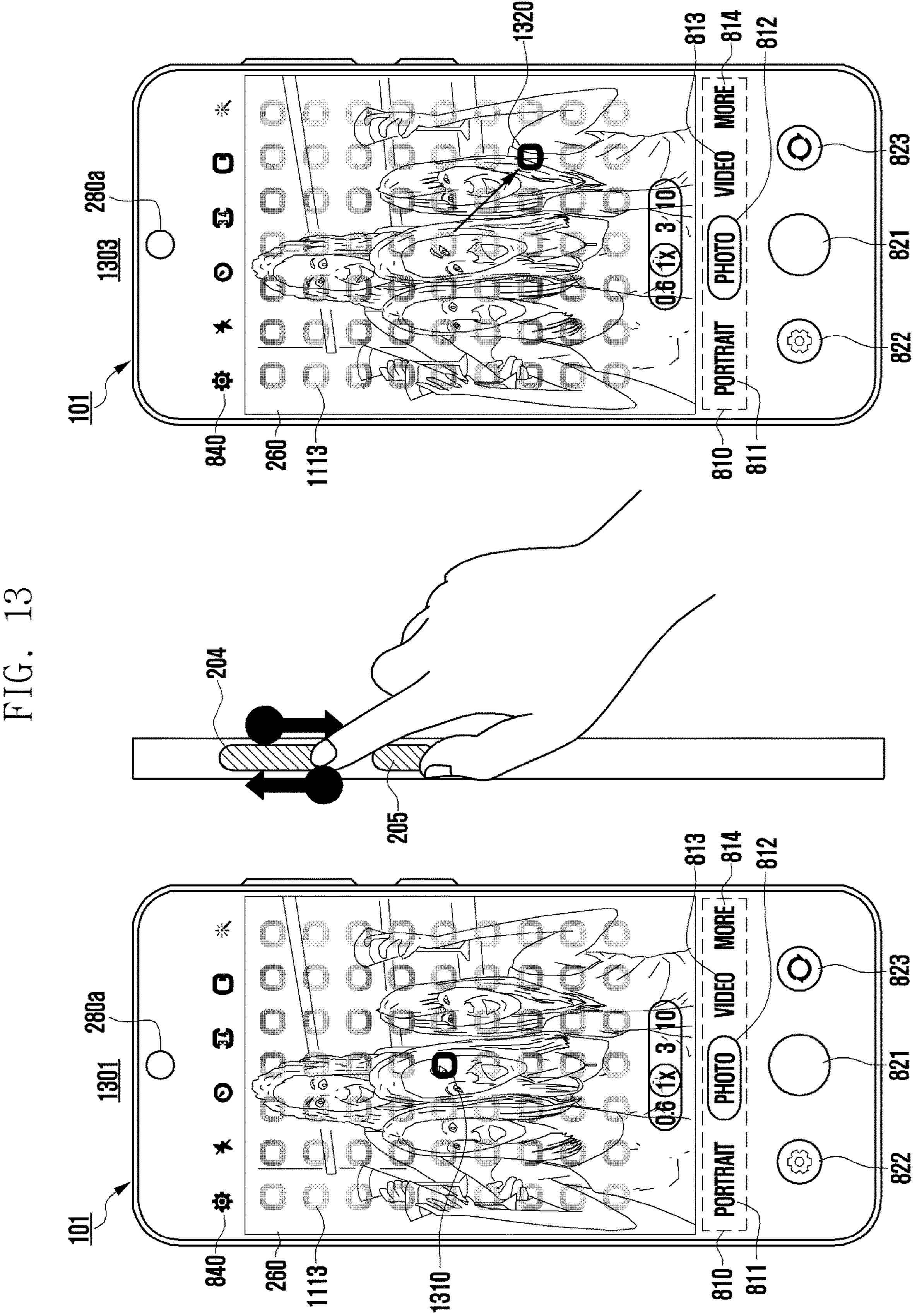
FIG. 13 is a diagram illustrating an example focus setting method of an electronic device according to various embodiments.

FIG. 13 is a diagram illustrating an example focus setting method of an electronic device 101 according to various embodiments.

In the following description with reference to FIG. 13, descriptions overlapping those in FIG. 8, FIG. 9, FIG. 10, FIG. 11, and FIG. 12 may not be repeated.

Referring to the screen 1301, if the multi-focus is selected from the focus settings, the electronic device 101 may display a user interface 1113 regarding the multi-focus on the currently acquired image under the control of the processor 120. The electronic device 101 may highlight the currently focused region using a user interface 1310 regarding highlighting. Upon sensing a swipe front 521, a swipe back 523, a swipe up 525, or a swipe down 527 on the first sensor 204 or the second region 204*b* as a user input, the electronic device 101 may change the focus region of at least one camera (for example, the first camera 280*a* and the second camera 280*b*) under the control of the processor 120. The electronic device 101 may output a haptic feedback regarding the swipe front 521, swipe back 523, swipe up 525, or swipe down 527 on the first sensor 204 or the second region 204*b* through the actuator 401.

In an embodiment, upon sensing a swipe front 521, a swipe back 523, a swipe up 525, or a swipe down 527 on the first sensor 204 and/or the second sensor 205 as a user input, the electronic device 101 may change the focus region of at least one camera (for example, the first camera 280*a* and the second camera 280*b*) under the control of the processor 120. The electronic device 101 may output a haptic feedback regarding the swipe front 521, swipe back 523, swipe up 525, or swipe down 527 on the first sensor 204 and/or the second sensor 205 through the actuator 401.

In an embodiment, upon sensing a vertical swipe user input (for example, swipe up and/or swipe down) and/or a horizontal swipe user input (for example, swipe front and/or swipe back) on the first sensor 204 and/or the second sensor 205, the electronic device 101 may change the focus region of at least one camera (for example, the first camera 280*a* and the second camera 280*b*) under the control of the processor 120. The electronic device 101 may output a haptic feedback regarding the vertical swipe user input (for example, swipe up and/or swipe down) and/or the horizontal swipe user input (for example, swipe front and/or swipe back) through the actuator 401.

Referring to the screen 1303, the electronic device 101 may change the focus region of at least one camera (for example, the first camera 280*a* and the second camera 280*b*) under the control of the processor 120, based on a swipe back 523, a swipe up 525, or a swipe down 527 on the first sensor 204 or the second region 204*b*. The electronic device 101 may display the currently focused region by highlighting the changed focus region 1320.

In an embodiment, the electronic device 101 may change the focus region of at least one camera (for example, the first camera 280*a* and the second camera 280*b*) under the control of the processor 120, based on a swipe back 523, a swipe up 525, or a swipe down 527 on the first sensor 204 and/or the second sensor 205. The electronic device 101 may display the currently focused region by highlighting the changed focus region 1320.

In an embodiment, the electronic device 101 may change the focus region of at least one camera (for example, the first camera 280*a* and the second camera 280*b*) under the control of the processor 120, based on at least one of a vertical swipe user input (for example, swipe up and/or swipe down) and/or a horizontal swipe user input (for example, swipe front and/or swipe back) on the first sensor 204 and/or the second sensor 205. The electronic device 101 may display the currently focused region by highlighting the changed focus region 1320.

FIG. 14 is a diagram illustrating an example focus setting method of an electronic device 101 according to various embodiments.

In the following description with reference to FIG. 14, descriptions overlapping those in FIG. 8, FIG. 9, FIG. 10, FIG. 11, FIG. 12, and FIG. 13 may not be repeated.

Referring to the screen 1401, if the manual focus is selected from the focus settings by a user input, the electronic device 101 may display a user interface 1114 regarding the manual focus on the currently acquired image 1140 under the control of the processor 120. The user interface 1114 regarding the manual focus may include a user interface regarding a slider.

In an embodiment, the electronic device 101 may control the focus value of at least one camera (for example, the first camera 280*a* and the second camera 280*b*) to be changed, based on a user input corresponding to a swipe front 521, a swipe back 523, a swipe up 525, or a swipe down 527 on the first sensor 204 or the second region 204*b*, under the control of the processor 120. The electronic device 101 may output a haptic feedback regarding the user input of swipe front 521, swipe back 523, swipe up 525, or swipe down 527 on the first sensor 204 or the second region 204*b* through the actuator 401 under the control of the processor 120.

In an embodiment, the electronic device 101 may control the focus value of at least one camera (for example, the first camera 280*a* and the second camera 280*b*) to be changed, based on a user input corresponding to a swipe front 521, a swipe back 523, a swipe up 525, or a swipe down 527 on the first sensor 204 and/or the second sensor 205, under the control of the processor 120. The electronic device 101 may output a haptic feedback regarding the user input of swipe front 521, swipe back 523, swipe up 525, or swipe down 527 on the first sensor 204 and/or the second sensor 205 through the actuator 401 under the control of the processor 120.

In an embodiment, the electronic device 101 may control the focus value of at least one camera (for example, the first camera 280*a* and the second camera 280*b*) to be changed, based on a vertical swipe user input (for example, swipe up and/or swipe down) and/or a horizontal swipe user input (for example, swipe front and/or swipe back) on the first sensor 204 and/or the second sensor 205 under the control of the processor 120. The electronic device 101 may output a haptic feedback regarding the vertical swipe user input (for example, swipe up and/or swipe down) and/or the horizontal swipe user input (for example, swipe front and/or swipe back) through the actuator 401 under the control of the processor 120. The screen 1405 may represent an image acquired through at least one camera (for example, the first camera 280*a* and the second camera 280*b*), the focus value of which has been changed based on a user input.

Figure 15:
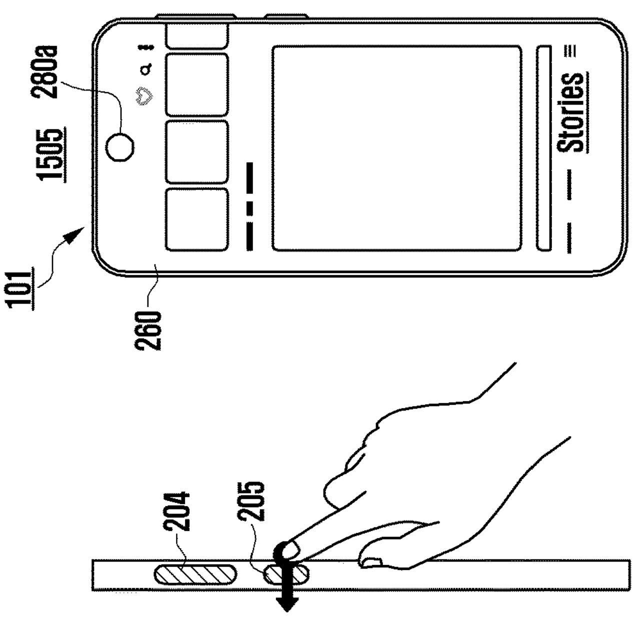
FIG. 15 is a diagram illustrating an example album application control method of an electronic device according to various embodiments.
Figure 15:
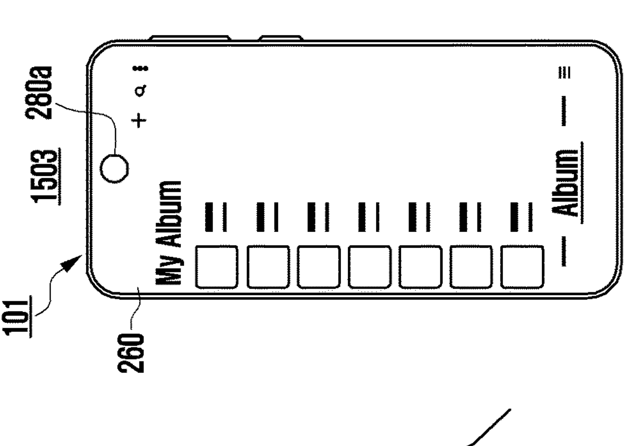
Figure 15:
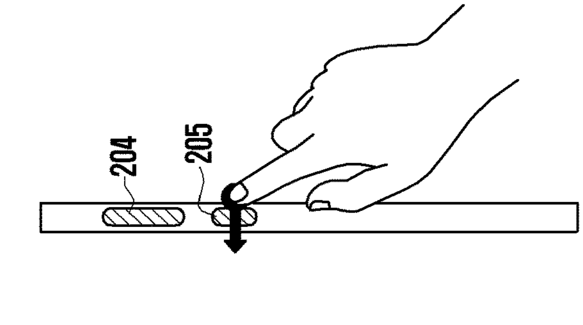
Figure 15:
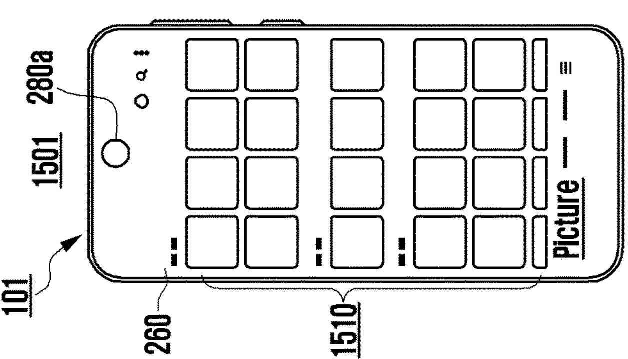

FIG. 15 is a diagram illustrating an example album application control method of an electronic device 101 according to various embodiments.

In an embodiment, if a gallery 822 is selected from a user interface currently displayed by a camera application, the electronic device 101 may execute a gallery application.

Referring to the screen 1501, if the gallery application is executed, a picture tab may be displayed such that stored images and/or videos are displayed as items 1510. When stored images and/or videos are displayed as items on the picture tab, representative images or reduces images of the stored images and/or videos may be displayed as items.

Referring to the screen 1503, the electronic device 101 may switch from the picture tab to an album tab upon sensing a swipe front 521 or a swipe back 523 on the first sensor 204 or the second sensor 205 as a user input under the control of the processor 120. The electronic device 101 may output a haptic feedback regarding the swipe front 521 or swipe back 523 on the first sensor 204 or the second sensor 205 through the actuator 401 under the control of the processor 120. The album tab may be a folder in which one or more pictures are classified and stored.

In an embodiment, the electronic device 101 may switch from the picture tab to an album tab upon sensing a horizontal swipe user input (for example, swipe front and/or swipe back) on the first sensor 204 and/or the second sensor 205 under the control of the processor 120. The electronic device 101 may output a haptic feedback regarding the horizontal swipe user input (for example, swipe front and/or swipe back) through the actuator 401 under the control of the processor 120.

In an embodiment, the electronic device 101 may switch from the picture tab to an album tab upon sensing a vertical swipe user input (for example, swipe up and/or swipe down) and/or a horizontal swipe user input (for example, swipe front and/or swipe back) on the first sensor 204 and/or the second sensor 205 under the control of the processor 120. The electronic device 101 may output a haptic feedback regarding the vertical swipe user input (for example, swipe up and/or swipe down) and/or the horizontal swipe user input (for example, swipe front and/or swipe back) through the actuator 401 under the control of the processor 120.

Referring to the screen 1505, the electronic device 101 may switch from the album tab to a story tab upon sensing a swipe front 521 or a swipe back 523 on the first sensor 204 or the second sensor 205 as a user input under the control of the processor 120. The story tab may be a folder in which one or more pictures are classified according to the time, topic, or human figure and stored.

Referring to the screen 1505, the electronic device 101 may switch from the album tab to a story tab upon sensing a horizontal swipe user input (for example, swipe front and/or swipe back) on the first sensor 204 or the second sensor 205 under the control of the processor 120. The story tab may be a folder in which one or more pictures are classified according to the time, topic, or human figure and stored.

In an embodiment, the electronic device 101 may switch from the album tab to a story tab upon sensing a vertical swipe user input (for example, swipe up and/or swipe down) and/or a horizontal swipe user input (for example, swipe front and/or swipe back) on the first sensor 204 and/or the second sensor 205 under the control of the processor 120. The story tab may be a folder in which one or more pictures are classified according to the time, topic, or human figure and stored.

Figure 16:
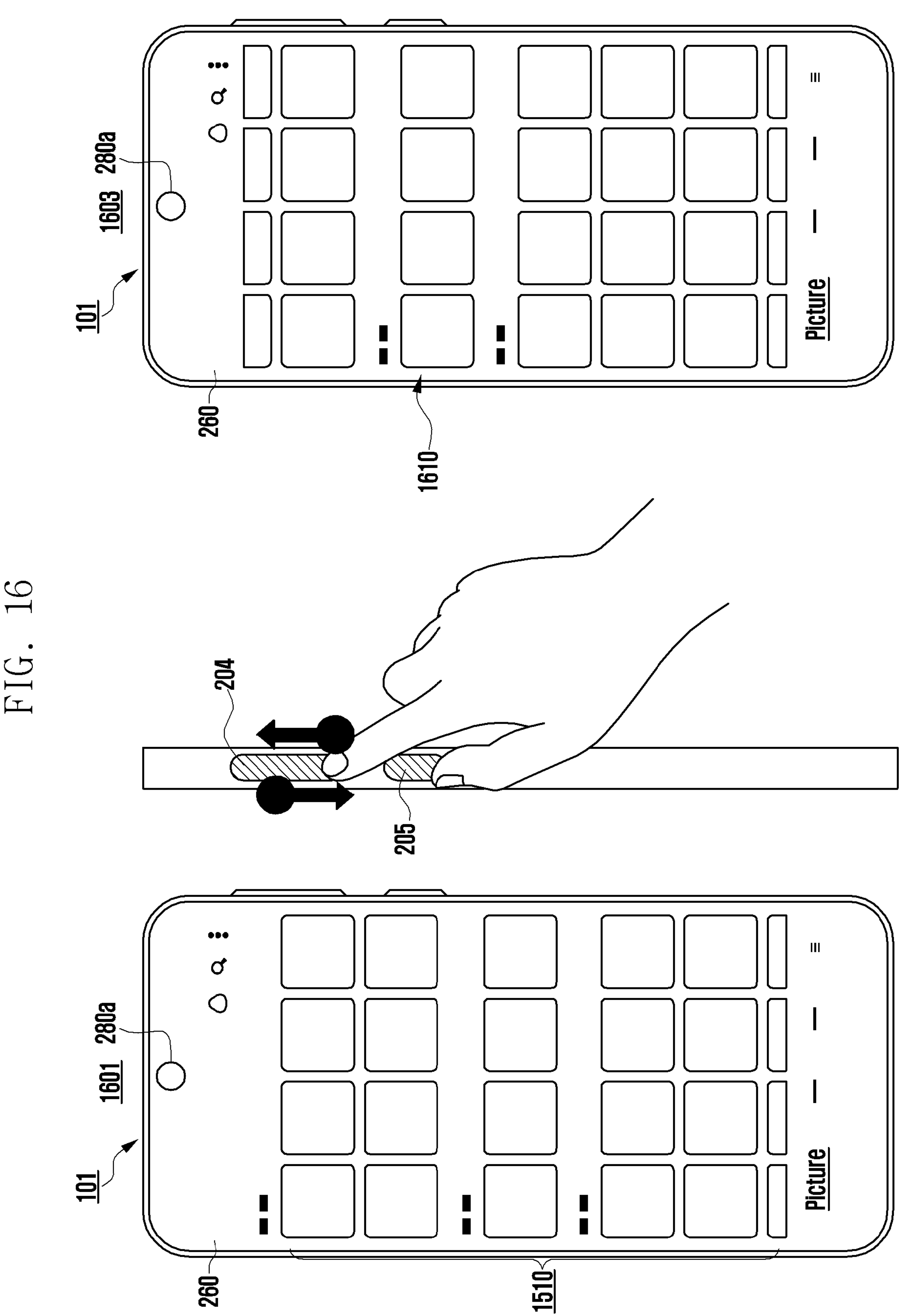
FIG. 16 is a diagram illustrating an example album application control method of an electronic device according to various embodiments.

FIG. 16 is a diagram illustrating an example album application control method of an electronic device 101 according to various embodiments.

Referring to the screen 1601, if a gallery application is executed, a picture tab may be displayed such that stored images and/or videos are displayed as items 1510. When stored images and/or videos are displayed as items on the picture tab, representative images or reduces images of the stored images and/or videos may be displayed as items.

Referring to the screen 1603, the electronic device 101 may scroll and display stored images and/or videos as items 1610 upon sensing a swipe up 525 or a swipe down 527 on the first sensor 204 or the second sensor 205 under the control of the processor 120. The electronic device 101 may output a haptic feedback corresponding to the swipe up 525 or swipe down 527 on the first sensor 204 or the second sensor 205 through the actuator 401 under the control of the processor 120.

In an embodiment, the electronic device 101 may scroll and display stored images and/or videos as items 1610 upon sensing a vertical swipe user input (for example, swipe up and/or swipe down) on the first sensor 204 or the second sensor 205 under the control of the processor 120. The electronic device 101 may output a haptic feedback corresponding to the vertical swipe user input (for example, swipe up and/or swipe down) on the first sensor 204 or the second sensor 205 through the actuator 401 under the control of the processor 120.

In an embodiment, the electronic device 101 may scroll and display stored images and/or videos as items 1610 upon sensing a vertical swipe user input (for example, swipe up and/or swipe down) and/or a horizontal swipe user input (for example, swipe front and/or swipe back) on the first sensor 204 and/or the second sensor 205 under the control of the processor 120. The electronic device 101 may output a haptic feedback corresponding to the vertical swipe user input (for example, swipe up and/or swipe down) and/or the horizontal swipe user input (for example, swipe front and/or swipe back) through the actuator 401 under the control of the processor 120.

Figure 17:
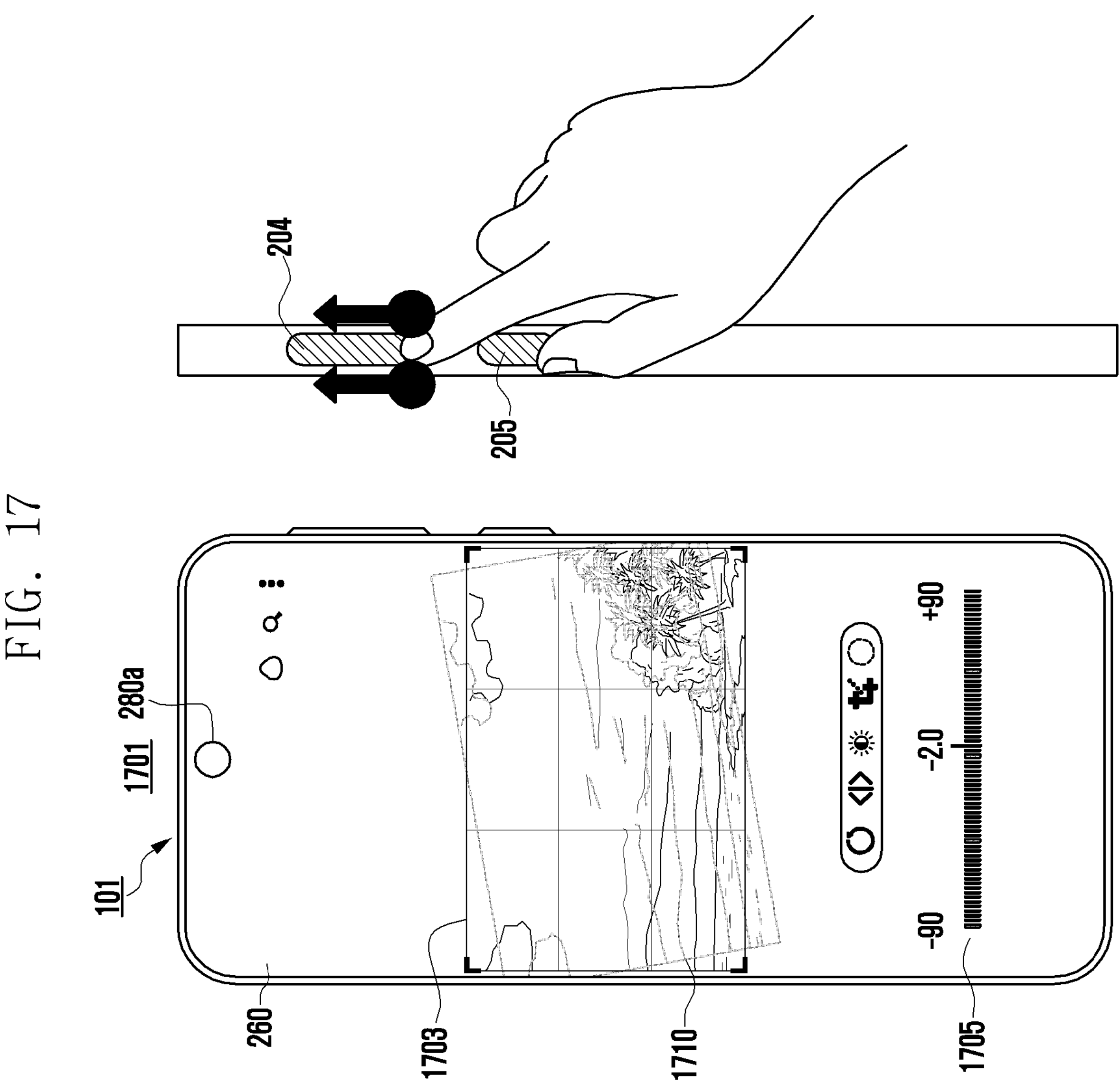
FIG. 17 is a diagram illustrating an example image editing method of an electronic device according to various embodiments.

FIG. 17 is a diagram illustrating an example image editing method of an electronic device 101 according to various embodiments.

On the screen 1701, if an image editing application is executed, the electronic device 101 may edit the selected image 1710 under the control of the processor 120. The screen 1701 represents a case in which a function regarding image rotation is selected during image editing. The electronic device 101 may rotate the selected image 1710 upon sensing a swipe up 525 or a swipe down 527 on the first sensor 204 or the second sensor 205 as a user input under the control of the processor 120. The image editing application may display a user interface 1705 regarding the image rotation angle and a user interface 1703 regarding a rotation guidance on the display 260. The electronic device 101 may output a haptic feedback regarding the swipe up 525 or swipe down 527 on the first sensor 204 or the second sensor 205 through the actuator 401 under the control of the processor 120.

In an embodiment, the electronic device 101 may rotate the selected image 1710 upon sensing a vertical swipe user input (for example, swipe up and/or swipe down) on the first sensor 204 and/or the second sensor 205 under the control of the processor 120. The image editing application may display a user interface 1705 regarding the image rotation angle and a user interface 1703 regarding a rotation guidance on the display 260. The electronic device 101 may output a haptic feedback regarding the vertical swipe user input (for example, swipe up and/or swipe down) through the actuator 401 under the control of the processor 120.

In an embodiment, the electronic device 101 may rotate the selected image 1710 upon sensing a vertical swipe user input (for example, swipe up and/or swipe down) and/or a horizontal swipe user input (for example, swipe front and/or swipe back) on the first sensor 204 and/or the second sensor 205 under the control of the processor 120. The image editing application may display a user interface 1705 regarding the image rotation angle and a user interface 1703 regarding a rotation guidance on the display 260. The electronic device 101 may output a haptic feedback regarding the vertical swipe user input (for example, swipe up and/or swipe down) and/or the horizontal swipe user input through the actuator 401 under the control of the processor 120.

Figure 18:
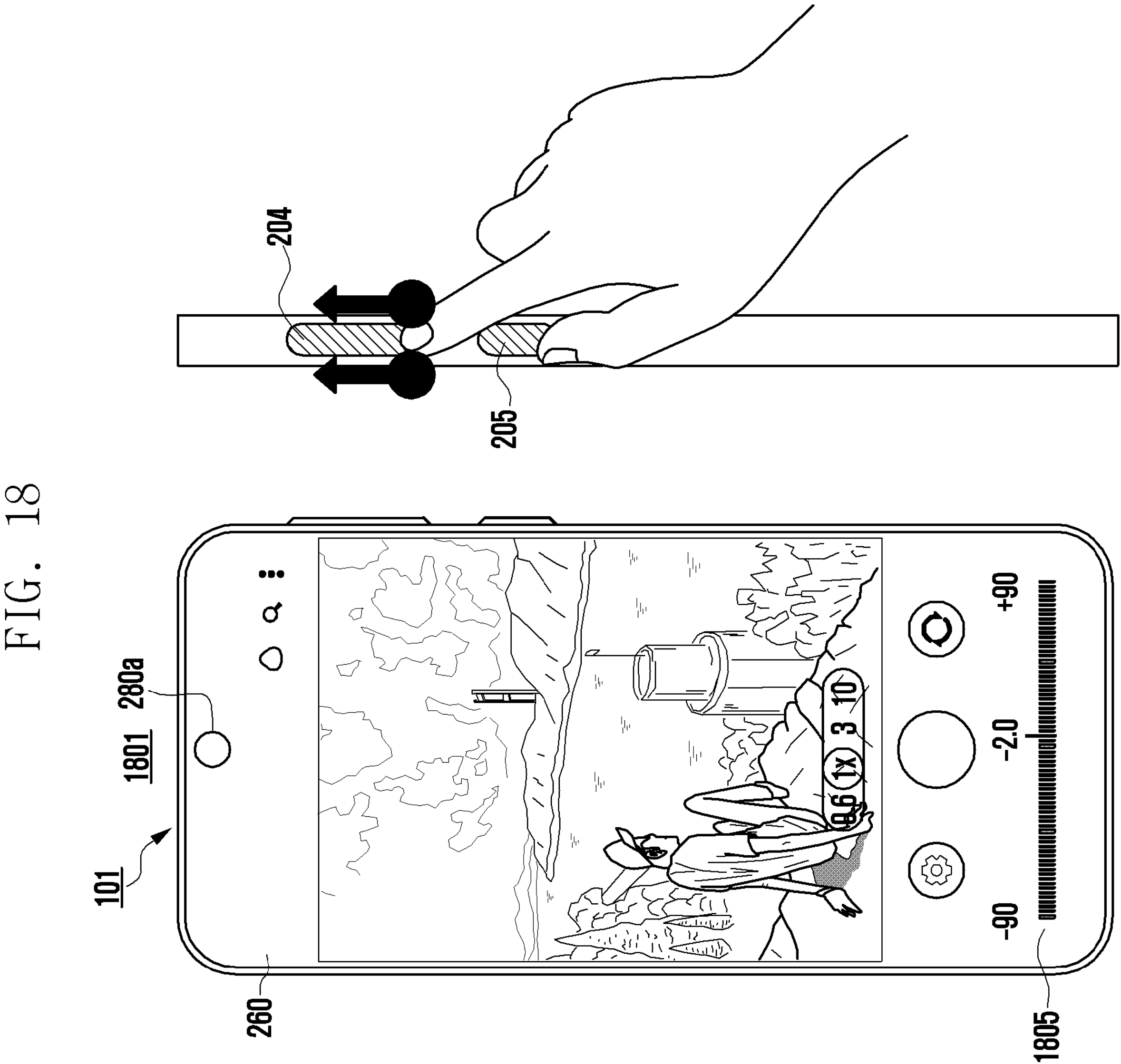
FIG. 18 is a diagram illustrating an example image editing method of an electronic device according to various embodiments.

FIG. 18 is a diagram illustrating an example image editing method of an electronic device 101 according to various embodiments.

On the screen 1801, if an image editing application is executed, the electronic device 101 may edit the selected image 1710 under the control of the processor 120. The screen 1801 represents a case in which a filter-related function is selected during image editing. The electronic device 101 may apply a filter value to the selected image upon sensing a swipe up 525 or a swipe down 527 on the first sensor 204 or the second sensor 205 as a user input under the control of the processor 120. The image editing application may display a user interface 1805 regarding the filter value on the display 260. The electronic device 101 may output a haptic feedback regarding the swipe up 525 or swipe down 527 on the first sensor 204 or the second sensor 205 through the actuator 401 under the control of the processor 120.

In an embodiment, the electronic device 101 may apply a filter value to the selected image upon sensing a vertical swipe user input (for example, swipe up and/or swipe down) on the first sensor 204 or the second sensor 205 under the control of the processor 120. The image editing application may display a user interface 1805 regarding the filter value on the display 260. The electronic device 101 may output a haptic feedback regarding the vertical swipe user input (for example, swipe up and/or swipe down) through the actuator 401 under the control of the processor 120.

In an embodiment, the electronic device 101 may apply a filter value to the selected image upon sensing a vertical swipe user input (for example, swipe up and/or swipe down) and/or a horizontal swipe user input (for example, swipe front and/or swipe back) on the first sensor 204 and/or the second sensor 205 under the control of the processor 120. The image editing application may display a user interface 1805 regarding the filter value on the display 260. The electronic device 101 may output a haptic feedback regarding the vertical swipe user input (for example, swipe up and/or swipe down) and/or the horizontal swipe user input through the actuator 401 under the control of the processor 120.

In an example embodiment, an electronic device may include a camera (for example, a first camera 280*a*, a second camera 280*b*), at least one processor comprising processing circuitry, at least one display, a sensor (for example, a first sensor 204 and/or a second sensor 205) having a sensing region on a side surface of the electronic device, and a memory.

In an example embodiment, the memory may store instructions and at least one processor, individually and/or collectively, is configured to cause the electronic device to perform a camera (for example, a first camera 280*a*, a second camera 280*b*) control operation. At least one processor, individually and/or collectively, may be configured to: execute a camera application for controlling the camera (for example, the first camera 280*a*, the second camera 280*b*), based on the camera application being executed, sense a vertical swipe input through the sensor (for example, the first sensor 204 and/or the second sensor 205), control a first function of the camera (for example, the first camera 280*a*, the second camera 280*b*), based on the vertical swipe input, sense a horizontal swipe input through the sensor (for example, the first sensor 204 and/or the second sensor 205), and control a second function of the camera (for example, the first camera 280*a*, the second camera 280*b*), based on the horizontal swipe input.

In an example embodiment, the sensor (for example, the first sensor 204 and/or the second sensor 205) may be disposed on a side surface of the electronic device 101, and may be configured to sense a touch input and a pressure input on the side surface of the electronic device.

In an example embodiment, the electronic device may further include an actuator configured to provide a haptic feedback in response to the vertical swipe user input and the horizontal swipe user input.

In an example embodiment, the sensing region may include a top portion, a bottom portion, a front portion, and a rear portion.

In an example embodiment, the vertical swipe input may include an input swiping from the top portion to the bottom portion or from the bottom portion to the top portion.

In an example embodiment, the horizontal swipe input may include an input swiping from the rear portion to the front portion or from the front portion to the rear portion.

In an example embodiment, at least one processor, individually and/or collectively, is configured to: based on the input having a pressure higher than a first pressure level being sensed through the sensor (for example, the first sensor 204 and/or the second sensor 205), control the camera (for example, the first camera 280*a*, the second camera 280*b*) to maintain focus on a subject and, based on the input having a pressure higher than a second pressure level being sensed through the sensor (for example, the first sensor 204 and/or the second sensor 205) while maintaining a pressure higher than the first pressure level, control the camera (for example, the first camera 280*a*, the second camera 280*b*) to capture an image of the subject.

In an example embodiment, at least one processor, individually and/or collectively, may be configured to: control settings of the camera (for example, the first camera 280*a*, the second camera 280*b*) to be switched from an automatic image capture mode to a manual image capture mode based on the horizontal swipe input being sensed through the sensor (for example, the first sensor 204 and/or the second sensor 205).

In an example embodiment, the camera (for example, the first camera 280*a*, the second camera 280*b*) may include a first camera and a second camera. At least one processor, individually and/or collectively, may be configured to: switch the camera such that an image acquired through the first camera is acquired through the second camera based on the vertical swipe input being sensed through the sensor (for example, the first sensor 204 and/or the second sensor 205).

In an example embodiment, at least one processor, individually and/or collectively, may be configured to: control magnification of the camera (for example, the first camera 280*a*, the second camera 280*b*) based on the vertical swipe input being sensed through the sensor (for example, the first sensor 204 and/or the second sensor 205).

In an example embodiment, a method for controlling a camera (for example, a first camera 280*a*, a second camera 280*b*) of an electronic device may include: executing a camera application for controlling the camera, based on the camera application being executed, sensing a vertical swipe input through a sensor (for example, a first sensor 204 and/or a second sensor 205), controlling a first function of the camera (for example, the first camera 280*a*, the second camera 280*b*), based on the vertical swipe input, sensing a horizontal swipe input through the sensor (for example, the first sensor 204 and/or the second sensor 205), and controlling a second function of the camera (for example, the first camera 280*a*, the second camera 280*b*), based on the horizontal swipe input.

In an example embodiment, the method for controlling the camera (for example, the first camera 280*a*, the second camera 280*b*) of the electronic device 101 may further include based on the input having a pressure higher than a first pressure level being sensed through the sensor (for example, the first sensor 204 and/or the second sensor 205), controlling the camera (for example, the first camera 280*a*, the second camera 280*b*) to maintain focus on a subject, and based on the input having a pressure higher than a second pressure level being sensed through the sensor (for example, the first sensor 204 and/or the second sensor 205) while maintaining a pressure higher than the first pressure level, controlling the camera (for example, the first camera 280*a*, the second camera 280*b*) to capture an image of the subject.

In an example embodiment, the method for controlling the camera (for example, the first camera 280*a*, the second camera 280*b*) of the electronic device may include controlling settings of the camera (for example, the first camera 280*a*, the second camera 280*b*) to be switched from an automatic image capture mode to a manual image capture mode based on the horizontal swipe input being sensed through the sensor (for example, the first sensor 204 and/or the second sensor 205).

In an example embodiment, the method for controlling the camera (for example, the first camera 280*a*, the second camera 280*b*) of the electronic device may include switching the camera such that an image acquired through the first camera is acquired through the second camera based on the vertical swipe input being sensed through the sensor (for example, the first sensor 204 and/or the second sensor 205).

In an example embodiment, the method for controlling the camera (for example, the first camera 280*a*, the second camera 280*b*) of the electronic device may include controlling magnification of the camera (for example, the first camera 280*a*, the second camera 280*b*) based the vertical swipe input being sensed through the sensor (for example, the first sensor 204 and/or the second sensor 205).

The electronic device according to various embodiments set forth herein may be one of various types of electronic devices. The electronic device may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and the disclosure includes various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one or all possible combinations of the items enumerated together in a corresponding one of the phrases. Such terms as "a first," "a second," "the first," and "the second" may be used to simply distinguish a corresponding element from another, and does not limit the elements in other aspect (e.g., importance or order). If an element (e.g., a first element) is referred to, with or without the term "operatively" or "communicatively", as "coupled with/to" or "connected with/to" another element (e.g., a second element), the element may be coupled/connected with/to the other element directly (e.g., wiredly), wirelessly, or via a third element.

As used in various embodiments of the disclosure, the term "module" may include a unit implemented in hardware, software, or firmware, or any combination thereof, and may be interchangeably used with other terms, for example, "logic," "logic block," "component," or "circuit". The "module" may be a single integrated component, or a minimum unit or part thereof, adapted to perform one or more functions. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions each may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., module or program) of the above-described elements may include a single entity or multiple entities, and some of the multiple entities may be separately disposed in another element. According to various embodiments, one or more of the above-described elements or operations may be omitted, or one or more other elements or operations may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a camera disposed on a front surface or a rear surface of the electronic device;

at least one processor comprising processing circuitry;

at least one display disposed on the front surface of the electronic device;

memory storing instructions; and at least one sensor having a sensing region on a side surface surrounding the front surface and the rear surface of the electronic device, wherein the at least one sensor is formed in a shape of a protruding button and is configured to sense a touch input and a pressure input on the side surface, wherein the instructions, when executed by the at least one processor, individually and/or collectively, cause the electronic device to:

execute a camera application for controlling the camera;

based on the camera application being executed, sense a vertical swipe input through the at least one sensor;

control a first function of the camera, based on the vertical swipe input;

sense a horizontal swipe input through the at least one sensor; and control a second function of the camera, based on the horizontal swipe input.

2. The electronic device of claim 1, wherein the instructions, when executed by the at least one processor, individually and/or collectively, cause the electronic device to:

based on the input having a pressure higher than a first pressure level being sensed through the at least one sensor, control the camera to maintain focus on a subject; and based on the input having a pressure higher than a second pressure level being sensed through the at least one sensor while maintaining a pressure higher than the first pressure level, control the camera to capture an image of the subject.

3. The electronic device of claim 1, further comprising an actuator configured to provide a haptic feedback in response to the vertical swipe input and/or the horizontal swipe input.

4. The electronic device of claim 1, wherein the sensing region comprises a top portion, a bottom portion, a front portion, and a rear portion.

5. The electronic device of claim 4, wherein the vertical swipe input comprises an input swiping from the top portion to the bottom portion or from the bottom portion to the top portion.

6. The electronic device of claim 4, wherein the horizontal swipe input comprises an input swiping from the rear portion to the front portion or from the front portion to the rear portion.

7. The electronic device of claim 1, wherein the instructions, when executed by the at least one processor, individually and/or collectively, cause the electronic device to control settings of the camera to be switched from an automatic image capture mode to a manual image capture mode based on the horizontal swipe input being sensed through the at least one sensor.

8. The electronic device of claim 1, wherein the camera comprises a first camera and a second camera, and wherein the instructions, when executed by the at least one processor, individually and/or collectively, cause the electronic device to switch the camera such that an image acquired through the first camera is acquired through the second camera based on the vertical swipe input being sensed through the at least one sensor.

9. The electronic device of claim 1, wherein the instructions, when executed by the at least one processor, individually and/or collectively, cause the electronic device to control magnification of the camera based on the vertical swipe input being sensed through the at least one sensor.

10. A method for controlling a camera of an electronic device, wherein at least one sensor has a sensing region on a side surface surrounding a front surface and a rear surface of the electronic device, wherein the at least one sensor is formed in a shape of a protruding button and is configured to sense a touch input and a pressure input on the side surface, the method comprising:

executing a camera application for controlling the camera;

based on the camera application being executed, sensing a vertical swipe input through the at least one sensor;

controlling a first function of the camera, based on the vertical swipe input;

sensing a horizontal swipe input through the at least one sensor; and controlling a second function of the camera, based on the horizontal swipe input.

11. The method of claim 10, further comprising an actuator configured to provide a haptic feedback in response to the vertical swipe user input and the horizontal swipe user input.

12. The method of claim 10, wherein the sensing region comprises a top portion, a bottom portion, a front portion, and a rear portion.

13. The method of claim 12, wherein the vertical swipe input comprises an input swiping from the top portion to the bottom portion or from the bottom portion to the top portion.

14. The method of claim 12, wherein the horizontal swipe input comprises an input swiping from the rear portion to the front portion or from the front portion to the rear portion.

15. The method of claim 10, further comprising:

based on the input having a pressure higher than a first pressure level being sensed through the at least one sensor, controlling the camera to maintain focus on a subject; and based on the input having a pressure higher than a second pressure level being sensed through the at least one sensor while maintaining a pressure higher than the first pressure level, controlling the camera so as to capture an image of the subject.

16. The method of claim 10, comprising controlling settings of the camera to be switched from an automatic image capture mode to a manual image capture mode based on the horizontal swipe input being sensed through the at least one sensor.

17. The method of claim 10, comprising switching the camera such that an image acquired through the first camera is acquired through the second camera based on the vertical swipe input being sensed through the at least one sensor.

18. The method of claim 10, comprising controlling magnification of the camera based on the vertical swipe input being sensed through the at least one sensor.

* * * * *